US012494175B2

(12) United States Patent
Kwon et al.

(10) Patent No.: US 12,494,175 B2
(45) Date of Patent: Dec. 9, 2025

(54) DISPLAY DEVICE

(71) Applicant: Samsung Display Co., Ltd., Yongin-si (KR)

(72) Inventors: Sangan Kwon, Yongin-si (KR); Soon-Dong Kim, Yongin-si (KR); Jihye Kim, Yongin-si (KR); Taehoon Kim, Yongin-si (KR); Changnoh Yoon, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/607,732

(22) Filed: Mar. 18, 2024

(65) Prior Publication Data

US 2025/0046255 A1 Feb. 6, 2025

(30) Foreign Application Priority Data

Aug. 2, 2023 (KR) ........................ 10-2023-0101205

(51) Int. Cl.
*G09G 3/3266* (2016.01)
*G09G 3/3233* (2016.01)

(52) U.S. Cl.
CPC ....... *G09G 3/3266* (2013.01); *G09G 2310/08* (2013.01); *G09G 2330/021* (2013.01)

(58) Field of Classification Search
None
See application file for complete search history.

(56) References Cited

U.S. PATENT DOCUMENTS

| | | | | |
|---|---|---|---|---|
| 7,663,302 B2 | 2/2010 | Shin et al. | | |
| 10,777,121 B1 * | 9/2020 | Liao | G09G 3/2092 |
| 11,341,933 B2 * | 5/2022 | Shin | G09G 3/035 |
| 2013/0176197 A1 * | 7/2013 | Hu | G09G 3/3648 345/87 |
| 2017/0116922 A1 * | 4/2017 | Jung | G09G 3/3258 |
| 2018/0197482 A1 * | 7/2018 | Choi | G09G 3/3266 |
| 2021/0035488 A1 | 2/2021 | Seo et al. | |
| 2021/0035489 A1 * | 2/2021 | Seo | G09G 3/035 |

(Continued)

FOREIGN PATENT DOCUMENTS

| | | |
|---|---|---|
| KR | 100711890 B1 | 4/2007 |
| KR | 1020200128925 A | 11/2020 |

(Continued)

*Primary Examiner* — Sepehr Azari
(74) *Attorney, Agent, or Firm* — CANTOR COLBURN LLP

(57) ABSTRACT

A display device includes a display panel including pixels connected to scan lines, a scan driving circuit including scan stages corresponding to the scan lines, respectively, where each of the scan stages receives a masking signal and a carry signal and outputs a scan signal, and a driving controller which divides the display panel into the first display area and the second display area, controls the scan driving circuit such that the first display area and the second display area operate with different frequencies, and outputs start signals provided at different timings. A first scan stage disposed in the first display area from among the scan stages receives a first start signal of the start signals as the carry signal, and a first scan stage disposed in the second display area from among the scan stages receives a second start signal of the start signals as the carry signal.

20 Claims, 18 Drawing Sheets

(56) References Cited

U.S. PATENT DOCUMENTS

| | | | | |
|---|---|---|---|---|
| 2021/0110774 | A1* | 4/2021 | Cho | G09G 3/3275 |
| 2021/0407352 | A1* | 12/2021 | Seo | G09G 3/3266 |
| 2021/0407424 | A1* | 12/2021 | Long | G09G 3/3266 |
| 2021/0407429 | A1* | 12/2021 | Seo | G09G 3/3233 |
| 2022/0020303 | A1* | 1/2022 | Kwon | G09G 3/3275 |
| 2022/0068202 | A1* | 3/2022 | Kim | G09G 5/14 |
| 2022/0139324 | A1* | 5/2022 | Jeong | G09G 3/3266<br>345/204 |
| 2022/0157250 | A1* | 5/2022 | Kim | G09G 3/3266 |
| 2023/0027673 | A1 | 1/2023 | Jeong | |
| 2025/0006133 | A1* | 1/2025 | Feng | G09G 3/3266 |

FOREIGN PATENT DOCUMENTS

| | | | |
|---|---|---|---|
| KR | 1020210014259 | A | 2/2021 |
| KR | 1020230016775 | A | 2/2023 |

* cited by examiner

DISPLAY DEVICE

This application claims priority to Korean Patent Application No. 10-2023-0101205, filed on Aug. 2, 2023, and all the benefits accruing therefrom under 35 U.S.C. § 119, the content of which in its entirety is herein incorporated by reference.

BACKGROUND

1. Field

Embodiments of the disclosure described herein relate to a display device capable of reducing power consumption.

2. Description of the Related Art

An organic light emitting display device among display devices displays an image by using an organic light emitting diode that generates light through the recombination of electrons and holes. The organic light emitting display device typically has various desired characteristics such as a fast response speed and low power consumption.

The organic light emitting display device may include pixels connected to data lines and scan lines. Each of the pixels generally includes an organic light emitting diode and a circuit unit for controlling the amount of current flowing to the organic light emitting diode. In response to a data signal, the circuit unit controls the amount of current that flows from a first driving voltage to a second driving voltage through the organic light emitting diode. In this case, there is generated a light of luminance corresponding to the amount of current flowing through the organic light emitting diode.

SUMMARY

As a display device is used in various fields, nowadays, a plurality of different images may be simultaneously displayed in one display device. Accordingly, a technology for reducing power consumption of the display device may be desired where the plurality of images are displayed.

Embodiments of the disclosure provide a display device capable of reducing power consumption.

According to an embodiment, a display device includes a display panel that includes a plurality of pixels connected to a plurality of scan lines, where a display area including a first display area and a second display area is defined in the display panel, a scan driving circuit including a plurality of scan stages corresponding to the plurality of scan lines, respectively, where each of the plurality of scan stages receives a masking signal and a carry signal and outputs a scan signal, and a driving controller which controls the scan driving circuit and outputs a plurality of start signals including a first start signal and a second start signal. In such an embodiment, the plurality of pixels includes a plurality of first pixels disposed in the first display area and a plurality of second pixels disposed in the second display area. In such an embodiment, the plurality of scan stages includes a plurality of first scan stages connected to the plurality of first pixels and a plurality of second scan stages connected to the plurality of second pixels. In such an embodiment, a first first scan stage among the plurality of first scan stages receives the first start signal as the carry signal from the driving controller, and a first second scan stage among the plurality of second scan stages receives the second start signal as the carry signal from the driving controller.

In an embodiment, when the scan signal is output from a last scan stage among the plurality of first scan stages, the second start signal may be output to the first second scan stage.

In an embodiment, a first second display area and a second second display area adjacent to the first second display area may be defined in the second display area, and during a multi-frequency mode, the driving controller may control the first second display area and the second second display area by using the masking signal to operate the first second display area and the second second display area with different driving frequencies.

In an embodiment, a first driving frequency of the first display area may be lower than a first second driving frequency of the first second display area, and a second second driving frequency of the second second display area may be lower than the first second driving frequency of the first second display area.

In an embodiment, during the multi-frequency mode, at least one of the plurality of second scan stages may mask the scan signal provided to a plurality of second pixels disposed in the second second display area from among the plurality of second pixels based on the masking signal.

In an embodiment, a number of the plurality of start signals may be half a maximum number of areas operatable with different driving frequencies from each other in the display area.

In an embodiment, when the masking signal provided to the first first scan stage is enabled, the driving controller may disable the first start signal.

In an embodiment, when the masking signal provided to the first second scan stage is enabled, the driving controller may disable the second start signal.

In an embodiment, when the masking signal provided to a scan stage among the plurality of scan stages is enabled, the scan stage may mask the scan signal.

In an embodiment, each of the remaining first scan stages among the plurality of first scan stages other than the first first scan stage may receive the scan signal of a previous first scan stage as the carry signal, and each of the remaining second scan stages among the plurality of second scan stages other than the first second scan stage may receive the scan signal of a previous second scan stage as the carry signal.

In an embodiment, the display area may further include a third display area spaced from the first display area, with the second display area interposed therebetween, the plurality of start signals may further include a third start signal, the plurality of pixels may further include a plurality of third pixels disposed in the third display area, the plurality of scan stages may further include a plurality of third scan stages connected to the plurality of third pixels, and a first third scan stage among the plurality of third scan stages may receive the third start signal as the carry signal from the driving controller.

In an embodiment, A first third display area and a second third display area adjacent to the first third display area may be defined in the third display area, and during a multi-frequency mode, the driving controller may control the first third display area and the second third display area by using the masking signal to operate the first third display area and the second third display area with different driving frequencies.

In an embodiment, during the multi-frequency mode, the first display area, the second display area, and the first third display area may operate with a same driving frequency.

In an embodiment, during the multi-frequency mode, each of the first display area and the second third display area may operate with a first driving frequency, a second driving frequency of the second display area may be higher than the first driving frequency of the first display area, and a third driving frequency of the first third display area may be lower than the second driving frequency of the second display area.

According to an embodiment, a display device includes a display panel that includes a plurality of pixels connected to a plurality of scan lines, where a display area including a first display area and a second display area is defined in the display panel, a scan driving circuit that includes a plurality of scan stages corresponding to the plurality of scan lines, respectively, where each of the plurality of scan stages receives a masking signal and a carry signal and outputting a scan signal, and a driving controller. In such an embodiment, in a multi-frequency mode, the driving controller divides the display panel into a first display area and a second display area, controls the scan driving circuit such that the first display area and the second display area operate with different frequencies from each other, and outputs a plurality of start signals including a first start signal and a second start signal. In such an embodiment, the first start signal and the second start signal may be provided at different timings from each other, a first scan stage disposed in the first display area from among the plurality of scan stages may receive the first start signal as the carry signal, and a first scan stage disposed in the second display area from among the plurality of scan stages may receive the second start signal as the carry signal.

In an embodiment, when the scan signal is output from a last scan stage disposed in the first display area from among the plurality of scan stages, the second start signal may be output.

In an embodiment, A first second display area and a second second display area adjacent to the first second display area may be defined in the second display area, and during the multi-frequency mode, the driving controller may control the first second display area and the second second display area by using the masking signal to operate the first second display area and the second second display area with different driving frequencies.

In an embodiment, when the masking signal provided to the first scan stage disposed in the first display area is enabled, the driving controller may disable the first start signal.

In an embodiment, when the masking signal provided to the first scan stage disposed in the second display area is enabled, the driving controller may disable the second start signal.

In an embodiment, when the masking signal provided to a scan stage among the plurality of scan stages is enabled, the scan stage may mask the scan signal.

BRIEF DESCRIPTION OF THE DRAWINGS

The above and other features of embodiments of the disclosure will become apparent by describing in detail embodiments thereof with reference to the accompanying drawings.

DETAILED DESCRIPTION

Figure 1:
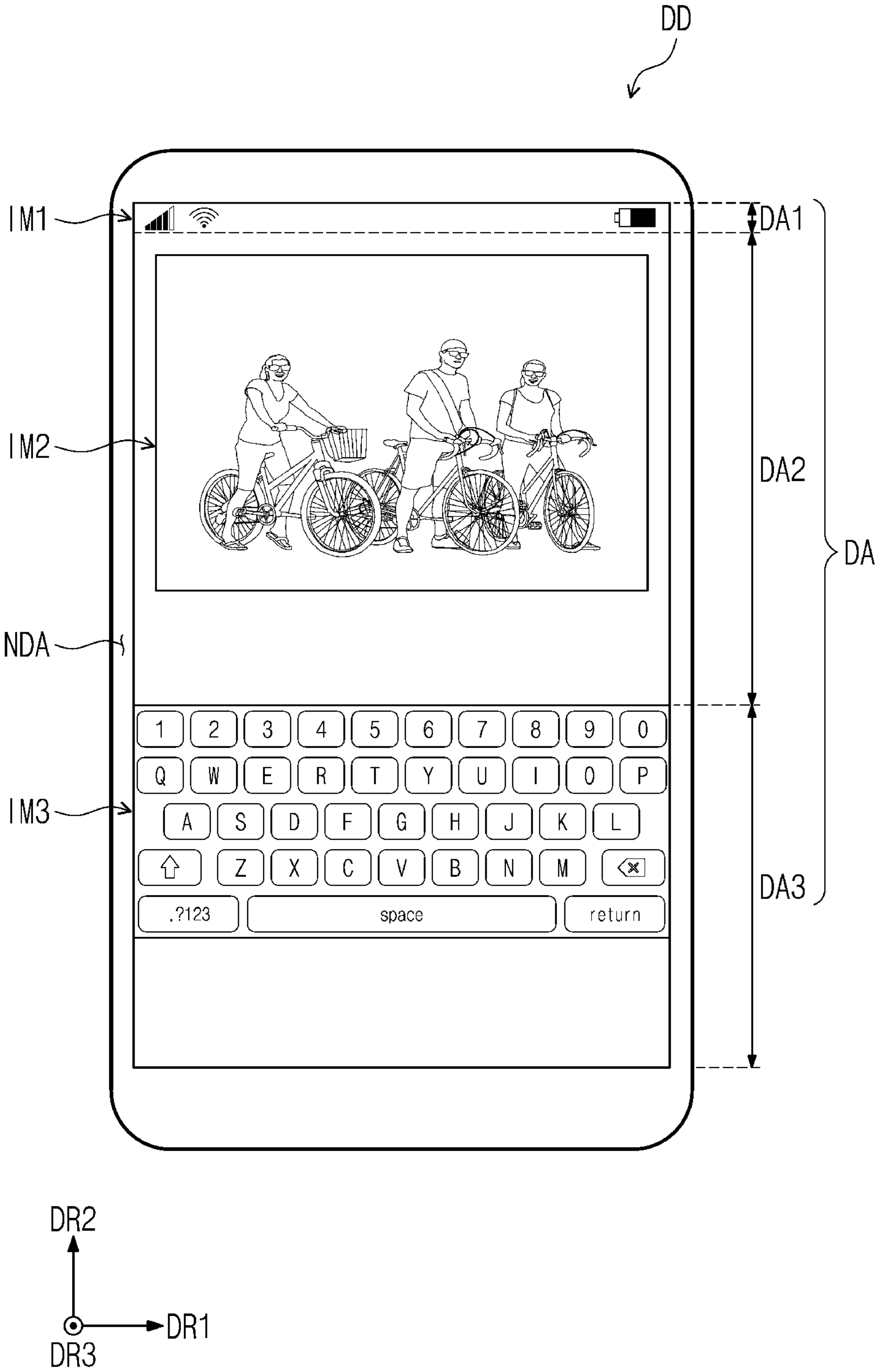
FIG. 1 is a perspective view illustrating a display device according to an embodiment of the disclosure.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

In the specification, the expression that a first component (or area, layer, part, portion, etc.) is "on", "connected to", or "coupled to" a second component means that the first component is directly on, connected to, or coupled to the second component or means that a third component is disposed therebetween.

Like reference numerals refer to like components. Also, in drawings, the thickness, ratio, and dimension of components are exaggerated for effectiveness of description of technical contents.

Although the terms "first", "second", etc. may be used to describe various components, the components should not be construed as being limited by the terms. The terms are only used to distinguish one component from another component. For example, without departing from the scope and spirit of the invention, a first component may be referred to as a "second component", and similarly, the second component may be referred to as the "first component".

Also, the terms "under", "below", "on", "above", etc. are used to describe the correlation of components illustrated in drawings. The terms that are relative in concept are described based on a direction shown in drawings.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. Thus, reference to "an" element in a claim followed by reference to "the" element is inclusive of one element and a plurality of the elements. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical terms and scientific terms) used in the specification have the same meaning as commonly understood by one skilled in the art to which the disclosure belongs. Furthermore, terms such as terms defined in the dictionaries commonly used should be interpreted as having a meaning consistent with the meaning in the context of the related technology, and should not be interpreted in ideal or overly formal meanings unless explicitly defined herein.

Embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, embodiments of the disclosure will be described in detail with reference to the accompanying drawings.

FIG. 1 is a perspective view of a display device according to an embodiment of the disclosure.

Referring to FIG. 1, a portable terminal is illustrated as an example of a display device DD according to an embodiment of the disclosure. The portable terminal may include a tablet, a personal computer (PC), a smartphone, a personal digital assistant (PDA), a portable multimedia player (PMP), a game console, a wristwatch-type electronic device, etc. However, the disclosure is not limited thereto. Embodiments of the disclosure may be used for small and medium-sized display devices such as a personal computer, a notebook computer, a kiosk, an automotive navigation unit, and a camera, in addition to a large-sized display device such as a television or an outside billboard, for example, and it would be understood that an embodiment of the display device DD may be applied to any other types of display device or electronic device without departing from the teachings herein.

In an embodiment, as illustrated in FIG. 1, a display surface on which a first image IM1, a second image IM2, and a third image IM3 are displayed is parallel to a plane defined by a first direction DR1 and a second direction DR2. The display device DD may include a plurality of areas that are distinguished from each other on the display surface. The display surface may include a display area DA in which the first image IM1, the second image IM2, and the third image IM3 are displayed, and a non-display area NDA adjacent to the display area DA. The non-display area NDA may be called a bezel area. In an embodiment, for example, the display area DA may be in the shape of a quadrangle. The non-display area NDA may surround the display area DA. In an embodiment, although not illustrated, the display device DD may include a partially curved shape. In such an embodiment, one area of the display area DA may have a curved shape.

The display area DA of the display device DD may include a first display area DA1, a second display area DA2, and a third display area DA3 arranged in this order in a direction opposite to the second direction DR2.

In a specific application program, the first image IM1 may be displayed in the first display area DA1, the second image IM2 may be displayed in the second display area DA2, and the third image IM3 may be display in the third display area DA3. In an embodiment, for example, the first image IM1 may be a status image, the second image IM2 may be a video, and the third image IM3 may be a video, a still image, or text information having a long change (ore refresh) period.

According to an embodiment of the disclosure, the display device DD may drive the first display area DA1, in which a still image such as a status image is displayed, by using a relatively low frequency, may drive the second display area DA2, in which a video is displayed, by using a normal frequency, and may drive the third display area DA3, in which a still image is displayed, by using a frequency lower than the normal frequency. The display device DD may reduce power consumption by decreasing a driving frequency of each of the first display area DA1 and the third display area DA3.

The size of each of the first display area DA1 to the third display area DA3 may be determined in advance or may be changed by an application program. In an embodiment, the display area DA may be divided into four or more display areas. A driving frequency of each of the display areas may be determined depending on a type of an image that is displayed therein (e.g., depending on whether an image displayed therein is a still image or a video).

Figure 2:
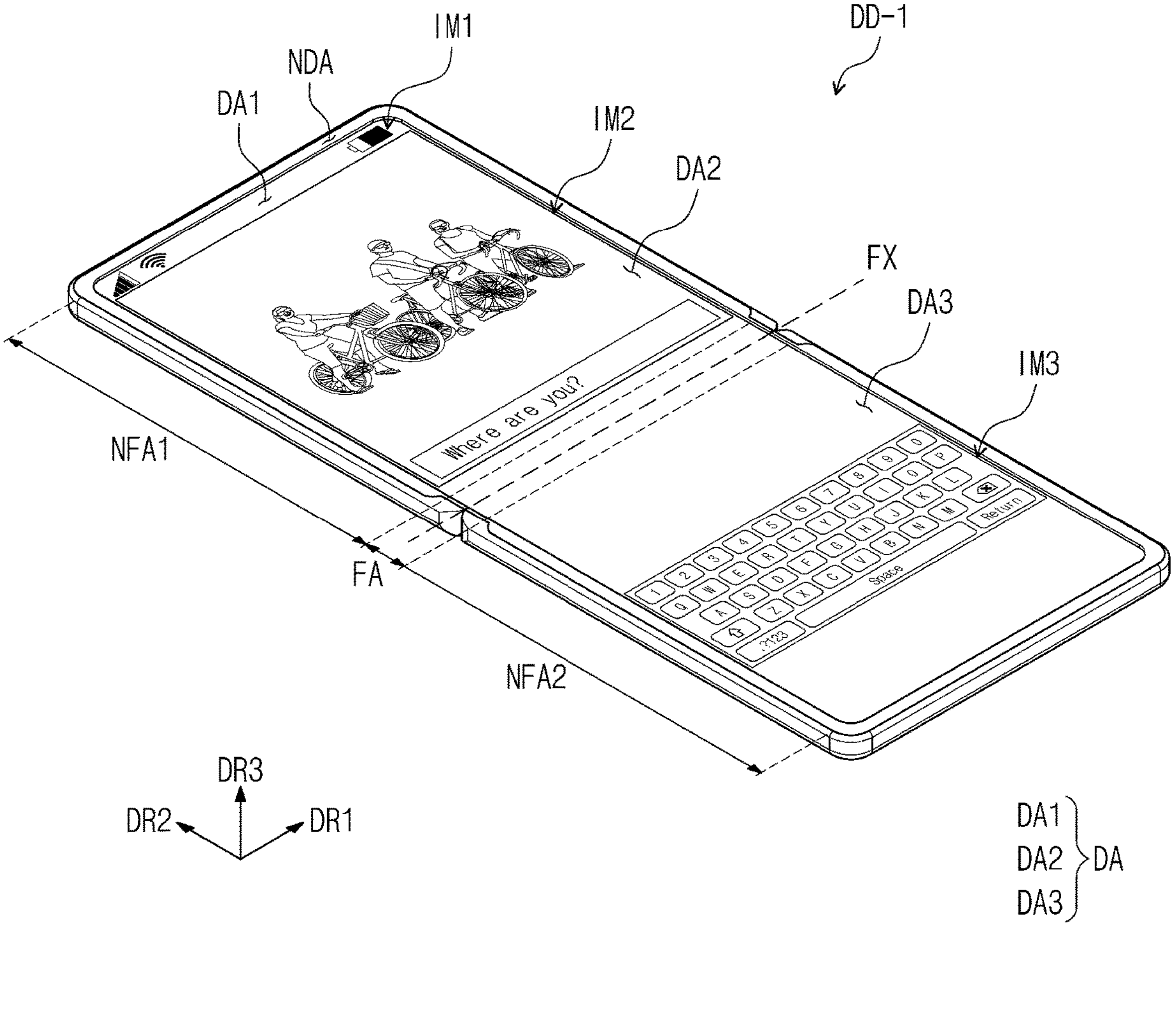
FIGS. 2 and 3 are perspective views of a display device according to an embodiment of the disclosure.
Figure 3:
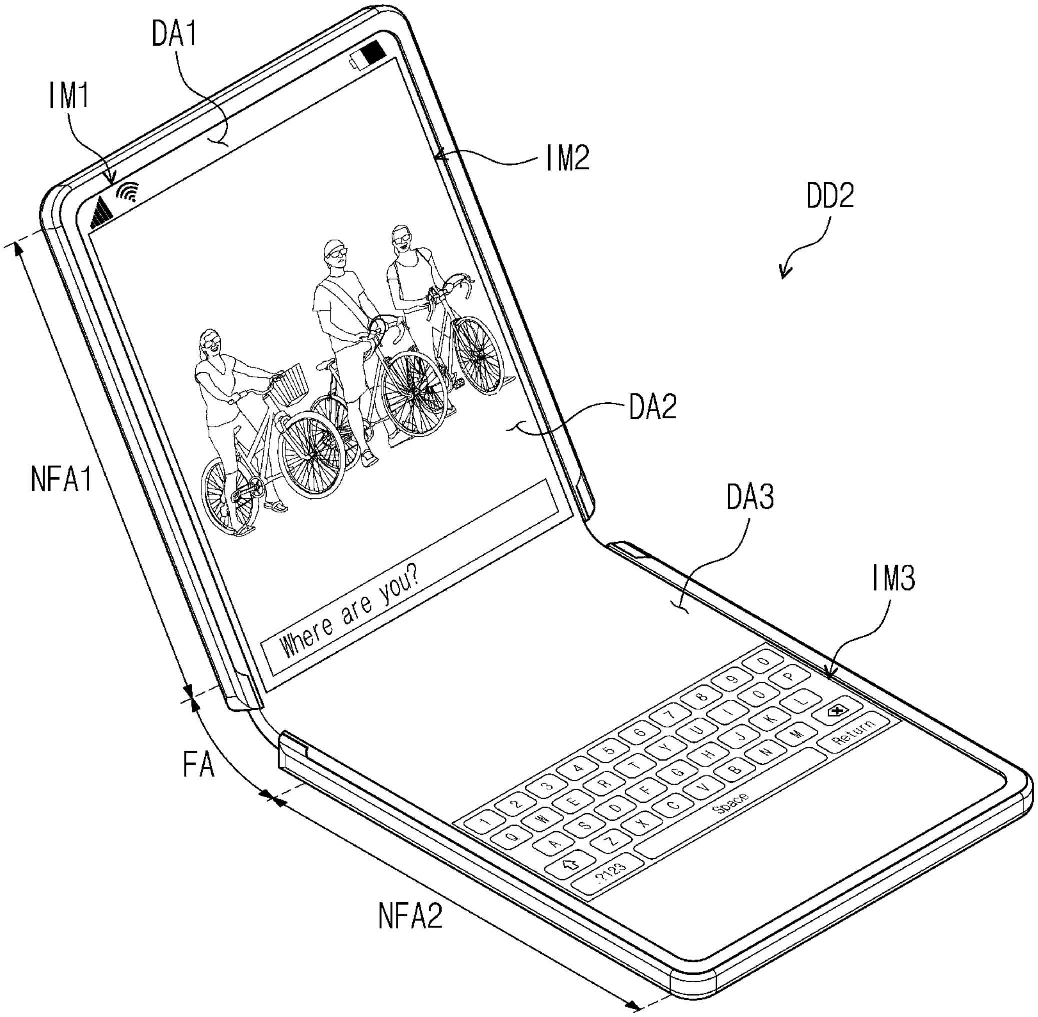

FIGS. 2 and 3 are perspective views of a display device according to an embodiment of the disclosure. FIG. 2 shows an embodiment of a display device in a state where a display device is unfolded, and FIG. 3 shows an embodiment of a display device in a state where a display device is folded.

Referring to FIGS. 2 and 3, an embodiment of a display device DD-1 may include the display area DA and the non-display area NDA. The display device DD-1 may display an image through the display area DA. The display area DA may include the plane defined by the first direction DR1 and the second direction DR2, with the display device DD-1 unfolded. A thickness direction of the display device DD-1 may be parallel to a third direction DR3 intersecting the first direction DR1 and the second direction DR2. Front surfaces (or upper surfaces) and rear surfaces (or lower surfaces) of members constituting the display device DD-1 may be defined with respect to the third direction DR3. The non-display area NDA may be referred to as a bezel area. In an embodiment, for example, the display area DA may be in the shape of a quadrangle. The non-display area NDA may surround the display area DA.

The display area DA may include a first non-folding area NFA1, a folding area FA, and a second non-folding area NFA2. The folding area FA may be bent about a folding axis FX extending in the first direction DR1.

When the display device DD-1 is folded, the first non-folding area NFA1 and the second non-folding area NFA2 may face each other. Accordingly, in a state where the display device DD-1 is fully folded, the display area DA may not be exposed to the outside, which may be referred to as "in-folding". This is only an example, and the operation of the display device DD-1 is not limited thereto.

For example, in an embodiment of the disclosure, when the display device DD-1 is folded, the first non-folding area NFA1 and the second non-folding area NFA2 may be opposite to each other. Accordingly, the first non-folding area NFA1 may be exposed to the outside in the folding state, which may be referred to as "out-folding".

In an embodiment, the display device DD-1 may be configured to operate in either the in-folding or the out-folding. Alternatively, the display device DD-1 may be configured to operate in both the in-folding and the out-folding. In an embodiment, the same area of the display device DD-1, for example, the folding area FA may be in-folded or out-folded (or may folded inwardly and outwardly). Alternatively, a partial area of the display device DD-1 may be in-folded, and the remaining area thereof may be out-folded.

An embodiment where a single folding area and two non-folding areas are defined is illustrated in FIGS. 2 and 3 as an example, but the number of folding areas and the number of non-folding areas are not limited thereto. In an embodiment, for example, the display device DD-1 may include a plurality of non-folding areas, the number of which is more than 2, and a plurality of folding areas; each of the plurality of folding areas may be interposed between non-folding areas adjacent to each other from among the plurality of non-folding areas.

An embodiment in which the folding axis FX is parallel to the minor axis of the display device DD-1 is illustrated in FIGS. 2 and 3 as an example, but the disclosure is not limited thereto. In an embodiment, for example, the folding axis FX may extend in a direction parallel to the major axis of the display device DD-1, for example, the second direction DR2. In such an embodiment, the first non-folding area NFA1, the folding area FA, and the second non-folding area NFA2 may be sequentially arranged in the first direction DR1.

The display area DA of the display device DD-1 may include the plurality of display areas DA1, DA2, and DA3. An embodiment where three display areas DA1, DA2, and DA3 are defined is illustrated in FIG. 2 as an example, but the number of display areas defined in the display area DA is not limited thereto.

The plurality of display areas DA1, DA2, and DA3 may include the first display area DA1, the second display area DA2, and the third display area DA3. In an embodiment, for example, the first display area DA1 may be an area where the first image IM1 is displayed, the second display area DA2 may be an area where the second image IM2 is displayed, and the third display area DA3 may be an area where the third image IM3 is displayed. In an embodiment, for example, the first image IM1 may be a status image, the second image IM2 may be a video, and the third image IM3 may be a video, a still image, or an image (e.g., text information) having a long change period.

The size of each of the first display area DA1 to the third display area DA3 may be determined in advance or may be changed by an application program.

In an embodiment, the first display area DA1 and the second display area DA2 may correspond to the first non-folding area NFA1, and the third display area DA3 may correspond to the second non-folding area NFA2. In an embodiment, a first portion of the folding area FA may correspond to the second display area DA2, and a second portion of the folding area FA may correspond to the third display area DA3.

In an embodiment, the entire folding area FA may correspond to only one of the second display area DA2 and the third display area DA3.

In an embodiment, as illustrated in FIG. 3, when the folding area FA is folded, the first display area DA1 and the second display area DA2 may correspond to the first non-folding area NFA1, and the third display area DA3 may correspond to the folding area FA and the second non-folding area NFA2.

An embodiment in which the display device DD-1 has a single folding area is illustrated in FIGS. 2 and 3 as an example of an electronic device, but the disclosure is not limited thereto. In an embodiment, for example, the disclosure may be applied to an electronic device having two or more folding areas, a rollable electronic device, or a slidable electronic device.

Hereinafter, for convenience of description, an embodiment of the display device DD illustrated in FIG. 1 will be described as an example, but the description to be given with reference to the display device DD may be identically applied to the display device DD-1 illustrated in FIGS. 2 and 3.

Figure 4:
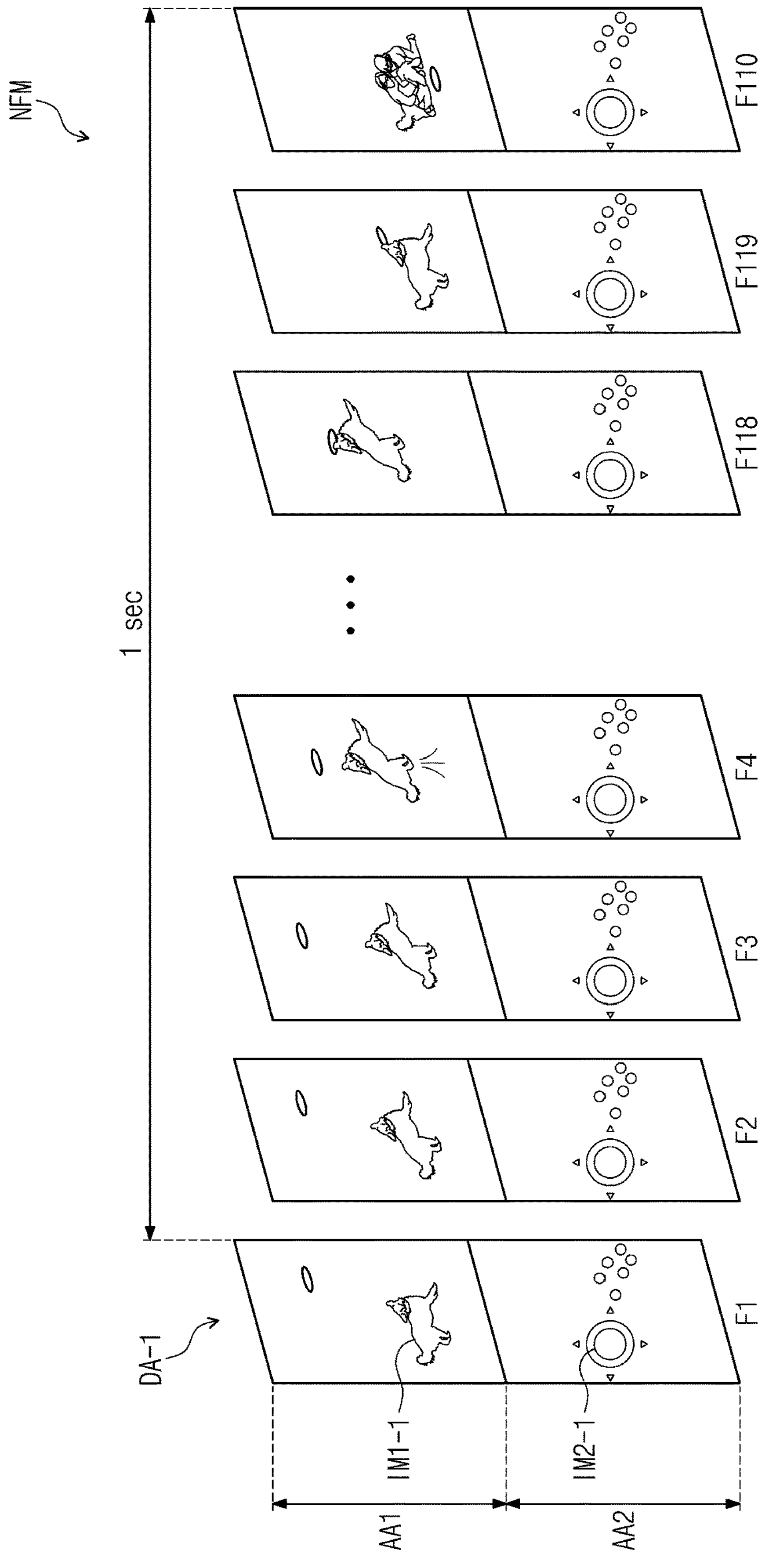
FIG. 4 is a diagram for describing an operation in one display area in a normal frequency mode according to an embodiment of the disclosure.
Figure 5:
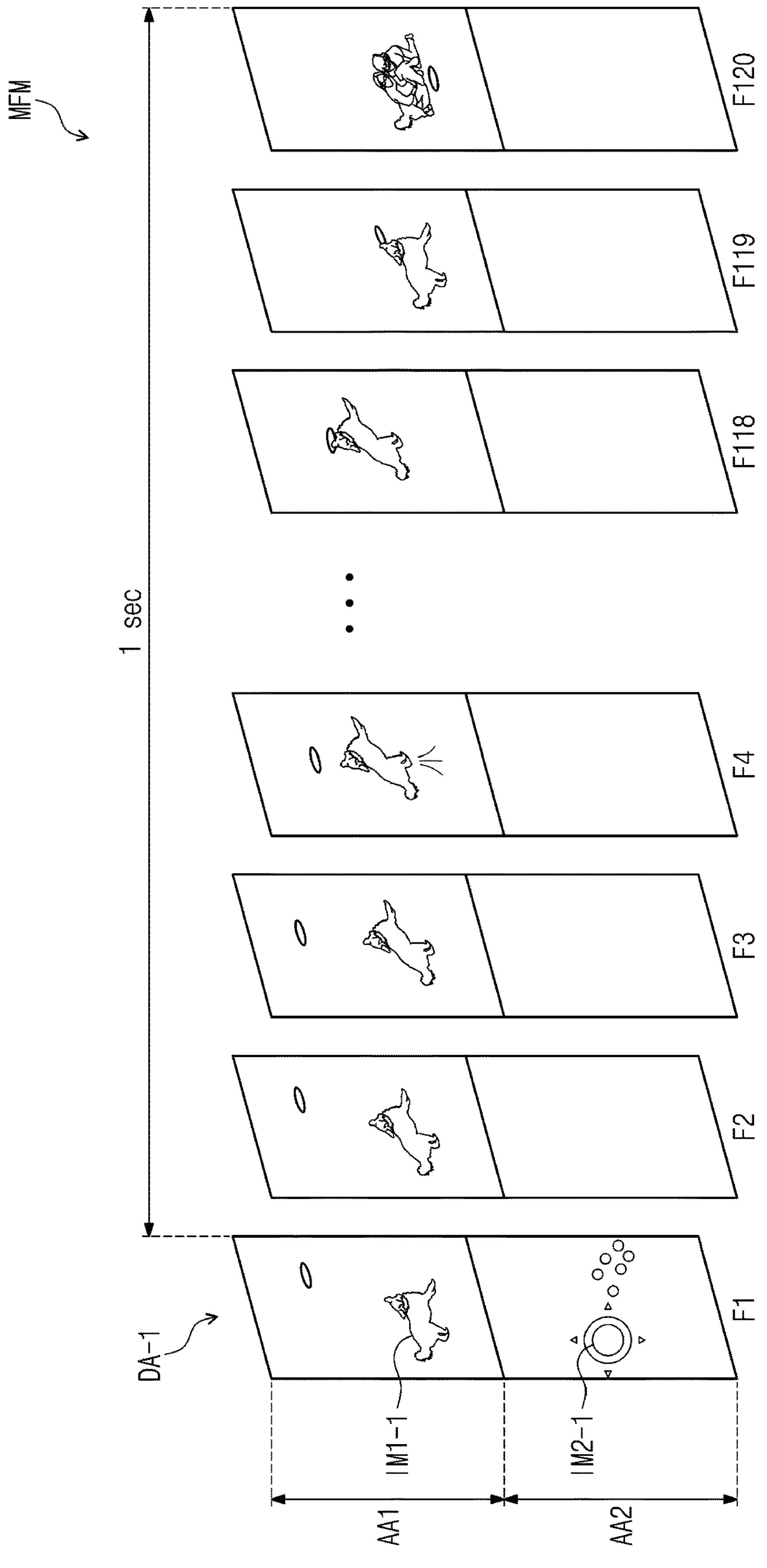
FIG. 5 is a diagram for describing an operation in one display area in a multi-frequency mode according to an embodiment of the disclosure.

FIG. 4 is a diagram for describing an operation in one display area in a normal frequency mode according to an embodiment of the disclosure, and FIG. 5 is a diagram for describing an operation in one display area in a multi-frequency mode according to an embodiment of the disclosure.

Referring to FIGS. 1, 4, and 5, a display area DA-1 may be one of the first display area DA1, the second display area DA2, and the third display area DA3.

The display area DA-1 may include a first sub-display area AA1 and a second sub-display area AA2. The first sub-display area AA1 may be a portion of the display area DA-1, and the second sub-display area AA2 may be the remaining portion of the display area DA-1.

The display area DA-1 according to an embodiment may operate differently depending on an operation mode. The operation mode may include (or be one of) a normal frequency mode NFM and a multi-frequency mode MFM. During the normal frequency mode NFM, the display device DD may drive the first sub-display area AA1 and the second sub-display area AA2 of one display area DA-1 with the normal frequency. In an embodiment, during the multi-frequency mode MFM, the display device DD may drive the first sub-display area AA1 of the display area DA-1, in which a first image IM1-1 is displayed, by using a first driving frequency and may drive the second sub-display area AA2 of the display area DA-1, in which a second image IM2-1 is displayed, with a second driving frequency lower than the normal frequency. In an embodiment, the first driving frequency may be the same as the normal frequency.

In an embodiment, for example, the first image IM1-1 that is displayed in the first sub-display area AA1 may be a video, and the second image IM2-1 that is displayed in the second sub-display area AA2 may be a still image or an image (e.g., a game control keypad) having a long change period.

In the normal frequency mode NFM, the driving frequencies of the first sub-display area AA1 and the second sub-display area AA2 of the display device DD may be the normal frequency. In an embodiment, for example, the normal frequency may be 120 Hertz (Hz). In the normal frequency mode NFM, images of first to 120th frames F1 to F120 may be displayed in each of the first sub-display area AA1 and the second sub-display area AA2 of the display device DD for 1 second. However, this is provided as an example, and the normal frequency according to an embodiment of the disclosure may be variously determined. In an embodiment, for example, the normal frequency may be 60 Hz.

In the multi-frequency mode MFM, the display device DD may set the driving frequency of the first sub-display area AA1, in which the first image IM1-1, that is, a video is displayed, to the first driving frequency and may set the driving frequency of the second sub-display area AA2, in which the second image IM2-1, that is, a still image is displayed, to the second driving frequency lower than the first driving frequency. The normal frequency may be the same as the first driving frequency. In an embodiment, for example, the first driving frequency may be 120 Hz, and the second driving frequency may be 1 Hz. The first driving frequency and the second driving frequency may be variously changed. In an embodiment, for example, the first driving frequency may be 144 Hz higher than the normal frequency or may be the same as the normal frequency, that is, 120 Hz. In an embodiment, for example, the second driving frequency may be one of 30 Hz, 10 Hz, and 1 Hz lower than the normal frequency.

In the multi-frequency mode MFM, when the first driving frequency is 120 Hz and the second driving frequency is 1 Hz, for 1 second, the first image IM1-1 corresponding to each of the first to 120th frames F1 to F120 may be displayed in the first sub-display area AA1 of the display device DD. The second image IM2-1 corresponding to only the first frame F1 may be displayed in the second sub-display area AA2, and an image corresponding to each of the remaining frames F2 to F120 may not be displayed in the second sub-display area AA2. Operations of the display device DD for driving display areas in the multi-frequency mode MFM will be described later.

Figure 6:
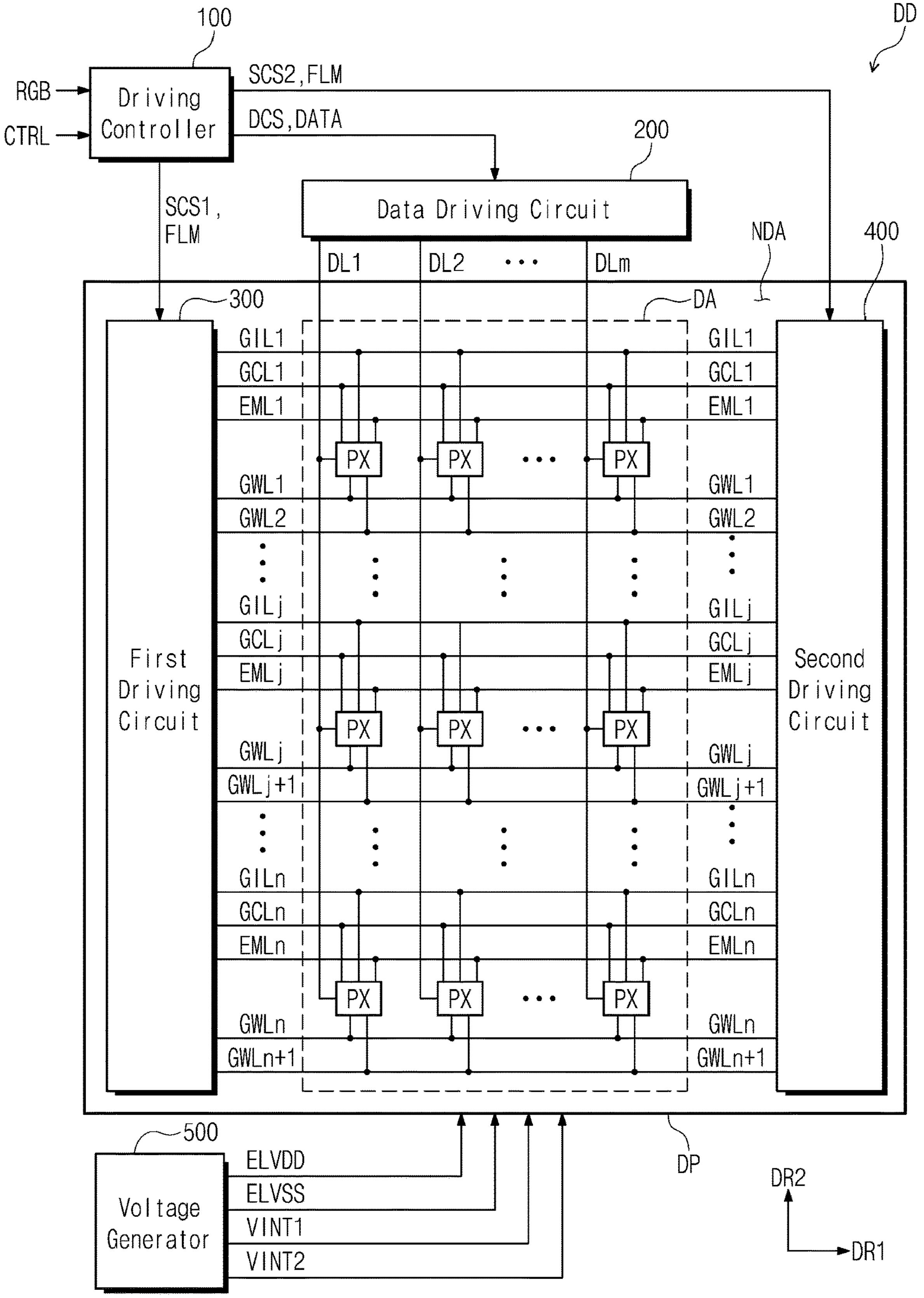
FIG. 6 is a block diagram of a display device according to an embodiment of the disclosure.

FIG. 6 is a block diagram of a display device according to an embodiment of the disclosure.

Referring to FIG. 6, an embodiment of the display device DD may include a display panel DP, a driving controller 100, a data driving circuit 200, a first driving circuit 300, a second driving circuit 400, and a voltage generator 500.

The display panel DP according to an embodiment of the disclosure may be a light emitting display panel, but the disclosure is not limited thereto. In an embodiment, for example, the display panel DP may be an organic light emitting display panel, a quantum dot display panel, a micro-light emitting diode (LED) display panel, or a nano-LED display panel. An emission layer of the organic light emitting display panel may include an organic light emitting material. An emission layer of the quantum dot display panel may include a quantum dot, a quantum rod, etc. An emission layer of the micro-LED display panel may include a micro-LED. An emission layer of the nano-LED display panel may include a nano-LED. Hereinafter, for convenience of description, embodiments where the display panel DP is the organic light emitting display panel will be described. The display area DA and the non-display area NDA adjacent to the display area DA may be defined in the display panel DP.

In an embodiment, the driving controller 100 may receive an input signal including an image signal RGB and a control signal CTRL. The driving controller 100 may generate an image data signal DATA by converting a data format of the image signal RGB in compliance with the specification for an interface with the data driving circuit 200. The driving controller 100 may control the data driving circuit 200, the first driving circuit 300, and the second driving circuit 400 such that an image is displayed in the display panel DP. The driving controller 100 may output a first scan control signal SCS1, a second scan control signal SCS2, and a data control signal DCS.

The driving controller 100 may output a plurality of start signals FLM to the first driving circuit 300 and the second driving circuit 400. The driving controller 100 may be also referred to as a "timing controller".

The data driving circuit 200 may receive the data control signal DCS and the image data signal DATA from the driving controller 100. The data driving circuit 200 may convert the image data signal DATA into data signals and may output the data signals to a plurality of data lines DL1 to DLm to be described later. The data signals may refer to analog voltages corresponding to a grayscale value of the image data signal DATA.

The voltage generator 500 may generate voltages used for the operation of the display panel DP. The voltage generator 500 may generate a first driving voltage ELVDD, a second driving voltage ELVSS, a first initialization voltage VINT1, and a second initialization voltage VINT2.

The display panel DP may include scan lines GIL1 to GILn, GCL1 to GCLn, and GWL1 to GWLn+1, emission control lines EML1 to EMLn, the data lines DL1 to DLm, and pixels PX. The first driving circuit 300 may be disposed on a first side of the display panel DP, and the second driving circuit 400 may be disposed on a second side of the display panel DP. The scan lines GIL1 to GILn, GCL1 to GCLn, and GWL1 to GWLn+1 and the emission control lines EML1 to EMLn may be electrically connected to the first driving circuit 300 and the second driving circuit 400.

The scan lines GIL1 to GILn, GCL1 to GCLn, and GWL1 to GWLn+1 and the emission control lines EML1 to EMLn may be arranged to be spaced from each other in the second direction DR2. The data lines DL1 to DLm may extend from the data driving circuit 200 in a direction opposite to the second direction DR2 and may be arranged to be spaced from each other in the first direction DR1.

In an embodiment, as illustrated in FIG. 6, the first driving circuit 300 and the second driving circuit 400 are disposed to face each other, with the pixels PX interposed therebetween. However, the disclosure is not limited thereto. In an embodiment, for example, the display device DD may include only one of the first driving circuit 300 and the second driving circuit 400.

The plurality of pixels PX may be electrically connected to the scan lines GIL1 to GILn, GCL1 to GCLn, and GWL1 to GWLn+1, the emission control lines EML1 to EMLn, and the data lines DL1 to DLm. Each of the plurality of pixels PX may be electrically connected to four scan lines and one emission control line. In an embodiment, for example, as illustrated in FIG. 4, the pixels PX belonging to the first row may be electrically connected to the scan lines GIL1, GCL1, GWL1, and GWL2 and the emission control line EML1. In such an embodiment, the pixels PX belonging to the j-th row may be electrically connected to the scan lines GILj, GCLj, GWLj, and GWLj+1 and the emission control line EMLj.

Each of the plurality of pixels PX may receive the first driving voltage ELVDD, the second driving voltage ELVSS, the first initialization voltage VINT1, and the second initialization voltage VINT2.

The first driving circuit 300 may receive the first scan control signal SCS1 from the driving controller 100. In response to the first scan control signal SCS1, the first driving circuit 300 may output scan signals to the scan lines GIL1 to GILn, GCL1 to GCLn, and GWL1 to GWLn+1 and may output emission signals to the emission control lines EML1 to EMLn.

The second driving circuit 400 may receive the second scan control signal SCS2 from the driving controller 100. In response to the second scan control signal SCS2, the second driving circuit 400 may output scan signals to the scan lines GIL1 to GILn, GCL1 to GCLn, and GWL1 to GWLn2 and may output emission signals to the emission control lines EML1 to EMLn.

Based on the input signal including the image signal RGB and the control signal CTRL, the driving controller 100 may divide the display panel DP into the first to third display areas DA1, DA2, and DA3 (refer to FIG. 1), may divide each of the first to third display areas DA1, DA2, and DA3 (refer to FIG. 1) into the first sub-display area AA1 (refer to FIG. 4) and the second sub-display area AA2 (refer to FIG. 4), and may set a driving frequency of each of the first sub-display area AA1 (refer to FIG. 4) and the second sub-display area AA2 (refer to FIG. 4).

In an embodiment, for example, in the normal frequency mode NFM (refer to FIG. 4), the driving controller 100 may drive the first sub-display area AA1 (refer to FIG. 4) and the second sub-display area AA2 (refer to FIG. 4) of each of the first to third display areas DA1, DA2, and DA3 (refer to FIG. 1) with the normal frequency (e.g., 120 Hz). In such an embodiment, in the multi-frequency mode MFM (refer to FIG. 5), the driving controller 100 may output the first scan control signal SCS1, the second scan control signal SCS2, and the data control signal DCS for driving the first sub-display area AA1 (refer to FIG. 5) of at least one of the first to third display areas DA1, DA2, and DA3 (refer to FIG. 1) with the first driving frequency (e.g., 120 Hz) and for driving the second sub-display area AA2 (refer to FIG. 5) thereof with the second driving frequency (e.g., 1 Hz). This will be described in detail later.

Figure 7:
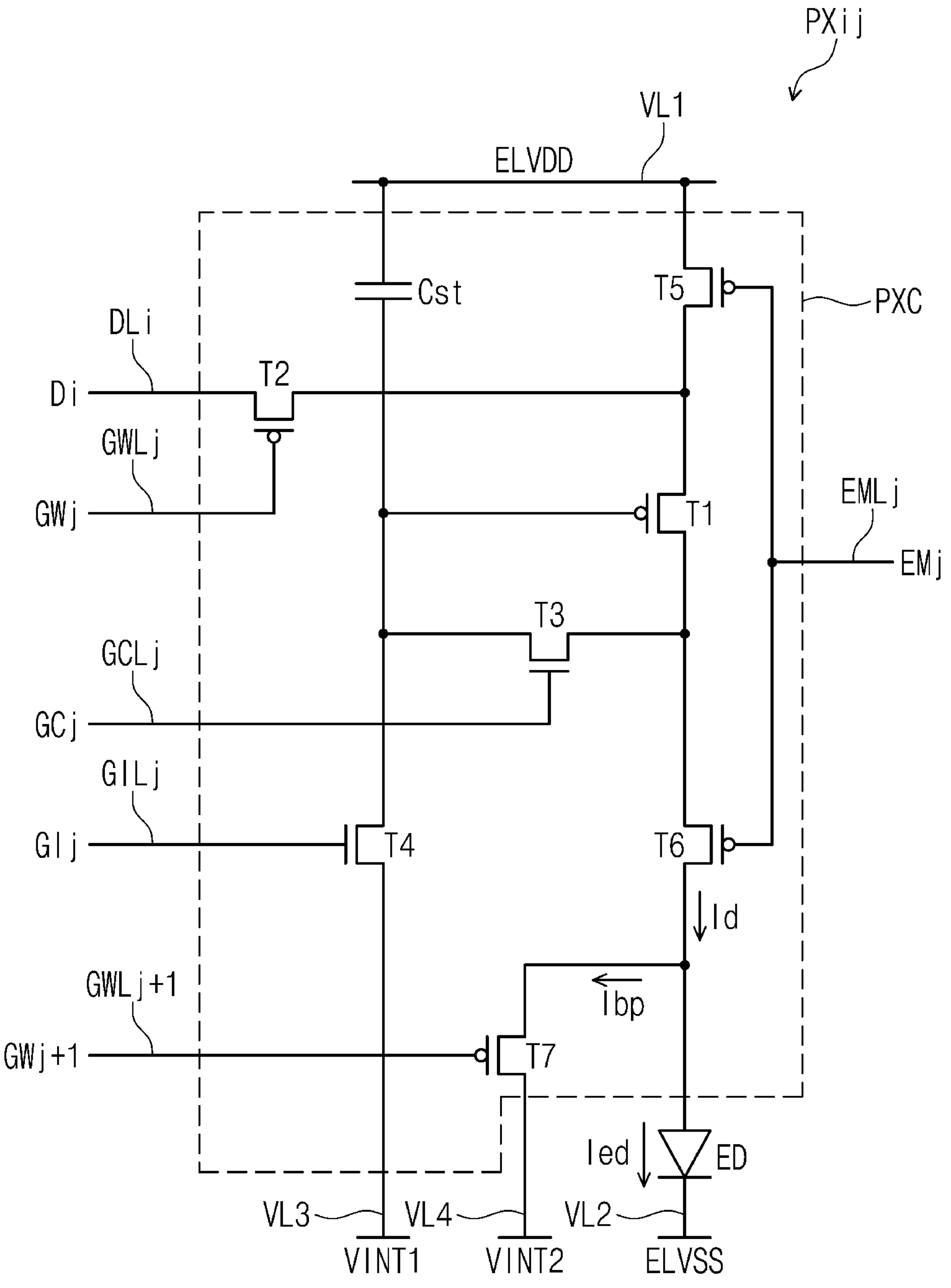
FIG. 7 is an equivalent circuit diagram of a pixel according to an embodiment of the disclosure.

FIG. 7 is an equivalent circuit diagram of a pixel according to an embodiment of the disclosure.

An equivalent circuit diagram of an embodiment of a pixel PXij that is connected with the i-th data line DLi of the data lines DL1 to DLm (refer to FIG. 6), the j-th scan lines GILj, GCLj, and GWLj and the (j+1)-th scan line GWLj+1 of the scan lines GIL1 to GILn, GCL1 to GCLn, and GWL1 to GWLn+1 (refer to FIG. 6), and the j-th emission control line EMLj of the emission control lines EML1 to EMLn (refer to FIG. 6) is illustrated in FIG. 7 as an example.

Each of the plurality of pixels PX illustrated in FIG. 6 may have the same circuit configuration as the equivalent circuit diagram of the pixel PXij illustrated in FIG. 7.

Each of the plurality of pixels PX may include a light emitting diode ED and a pixel circuit unit PXC for controlling the emission of the light emitting diode ED. The pixel circuit unit PXC may include one or more transistors and one or more capacitors. The first driving circuit 300 and the second driving circuit 400 may include transistors formed through a same process as the pixel circuit unit PXC.

In the pixel circuit unit PXC of the pixel PXij, each of third and fourth transistors T3 and T4 among first to seventh transistors T1 to T7 is an N-type transistor including an oxide semiconductor layer, and each of the first, second, fifth, sixth, and seventh transistors T1, T2, T5, T6, and T7 is a P-type transistor including a low-temperature polycrystalline silicon (LTPS) semiconductor layer. However, the disclosure is not limited thereto. In an embodiment, for example, all the first to seventh transistors T1 to T7 may be P-type transistors or N-type transistors. In an embodiment, at least one of the first to seventh transistors T1 to T7 may be an N-type transistor, and the remaining transistors may be P-type transistors. Also, the circuit configuration of the pixels PX according to an embodiment of the disclosure is not limited to FIG. 7. The pixel circuit unit PXC illustrated in FIG. 7 is provided only as an example, and the configuration of the pixel circuit unit PXC may be modified and implemented.

Referring to FIG. 7, the pixel PXij of the display device DD according to an embodiment may include the first to seventh transistors T1, T2, T3, T4, T5, T6, and T7, a capacitor Cst, and at least one light emitting diode ED. In an embodiment, in which one pixel PXij includes a single light emitting diode ED will be described.

In an embodiment, the scan lines GILj, GCLj, GWLj, and GWLj+1 may respectively transfer scan signals GIj, GCj, GWj, and GWj+1, and the emission control line EMLj may transfer an emission signal EMj. The data line DLi transfers a data signal Di. The data signal Di may have a voltage level corresponding to the image signal RGB input to the display device DD (refer to FIG. 6). First to fourth driving voltage lines VL1, VL2, VL3, and VL4 may respectively transfer the first driving voltage ELVDD, the second driving voltage ELVSS, the first initialization voltage VINT1, and the second initialization voltage VINT2.

The first transistor T1 may include a first electrode connected to the first driving voltage line VL1 through the fifth transistor T5, a second electrode electrically connected to an anode of the light emitting diode ED through the sixth transistor T6, and a gate electrode connected to a first end of the capacitor Cst. The first transistor T1 may receive the data signal Di transferred through the data line DLi depending on a switching operation of the second transistor T2 and may supply a driving current Id to the light emitting diode ED.

The second transistor T2 may include a first electrode connected to the data line DLi, a second electrode connected to the first electrode of the first transistor T1, and a gate electrode connected to the scan line GWLj. The second transistor T2 may be turned on depending on the scan signal GWj (or in response to the scan signal GWj having a turn-on level) transferred through the scan line GWLj and may transfer the data signal Di from the data line DLi to the first electrode of the first transistor T1.

The third transistor T3 may include a first electrode connected to the gate electrode of the first transistor T1, a second electrode connected to the second electrode of the first transistor T1, and a gate electrode connected to the scan line GCLj. The third transistor T3 may be turned on depending on the scan signal GCj GWj (or in response to the scan signal GCj having a turn-on level)transferred through the scan line GCLj, and thus, the gate electrode and the second electrode of the first transistor T1 may be connected to each other, that is, the first transistor T1 may be diode-connected.

The fourth transistor T4 may include a first electrode connected to the gate electrode of the first transistor T1, a second electrode connected to the third driving voltage line VL3 through which the first initialization voltage VINT1 is transferred, and a gate electrode connected to the scan line GILj. The fourth transistor T4 may be turned on depending on the scan signal GIj (or in response to the scan signal GIj having a turn-on level) transferred through the scan line GILj, and thus, the first initialization voltage VINT1 may be transferred to the gate electrode of the first transistor T1. As such, a voltage of the gate electrode of the first transistor T1 may be initialized. This operation may be referred to as an "an initialization operation".

The fifth transistor T5 may include a first electrode connected to the first driving voltage line VL1, a second electrode connected to the first electrode of the first transistor T1, and a gate electrode connected to the emission control line EMLj.

The sixth transistor T6 may include a first electrode connected to the second electrode of the first transistor T1, a second electrode connected to the anode of the light emitting diode ED, and a gate electrode connected to the emission control line EMLj.

The fifth transistor T5 and the sixth transistor T6 may be simultaneously turned on depending on the emission signal EMj (or in response to the emission signal EMj having a turn-on level) transferred through the emission control line EMLj. As such, the first driving voltage ELVDD may be compensated for through the diode-connected first transistor T1 to be supplied to the light emitting diode ED.

The seventh transistor T7 may include a first electrode connected to the second electrode of the sixth transistor T6, a second electrode connected to the fourth driving voltage line VL4, and a gate electrode connected to the scan line GWLj+1. The seventh transistor T7 may be turned on depending on the scan signal GWj+1 (or in response to the scan signal GWj+1 having a turn-on level) transferred through the scan line GWLj+1 and may bypass a current of the anode of the light emitting diode ED to the fourth driving voltage line VL4.

The first end of the capacitor Cst is connected to the gate electrode of the first transistor T1 as described above, and a second end of the capacitor Cst is connected to the first driving voltage line VL1. A cathode of the light emitting diode ED may be connected to the second driving voltage line VL2 through which the second driving voltage ELVSS is supplied. The structure of the pixel PXij according to an embodiment is not limited to the structure illustrated in FIG. 7. For example, in one pixel, the number of transistors, the number of capacitors, and the connection relationship thereof may be variously modified.

Figure 8:
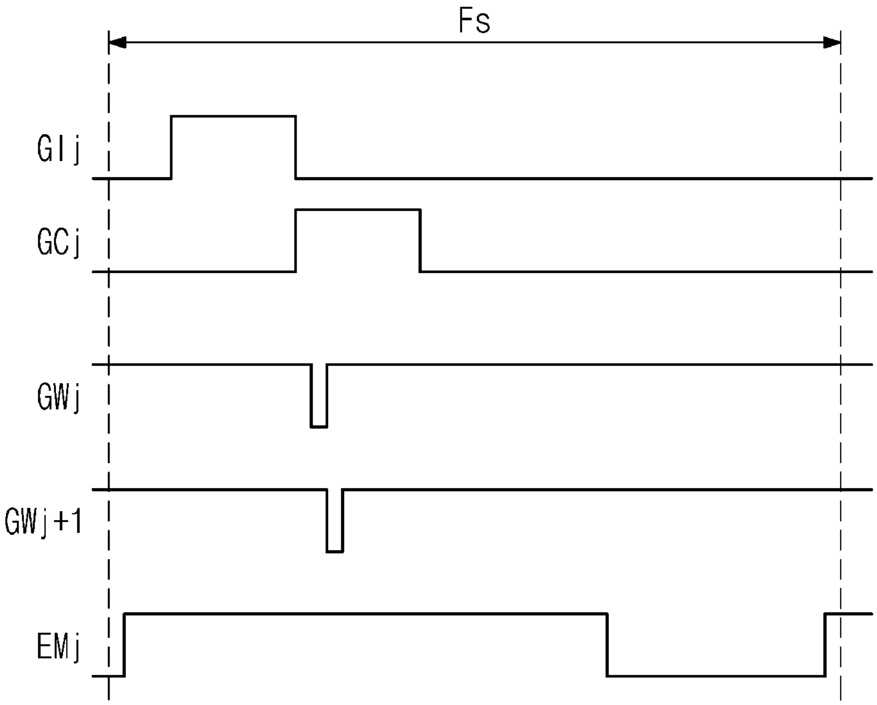
FIG. 8 is a timing diagram for describing an operation of a pixel illustrated in FIG. 7, according to an embodiment of the disclosure.

FIG. 8 is a timing diagram for describing an operation of a pixel illustrated in FIG. 7, according to an embodiment of the disclosure.

Referring to FIGS. 7 and 8, in an embodiment, the scan signal GIj of the high level may be provided through the scan line GILj during an initialization period in one frame Fs. When the fourth transistor T4 is turned on in response to the scan signal GIj having the high level, the first initialization voltage VINT1 may be transferred to the gate electrode of the first transistor T1 through the fourth transistor T4 such that the first transistor T1 is initialized.

Next, when the scan signal GCj of the high level is supplied through the scan line GCLj during a data programming and compensation period, the third transistor T3 may be turned on. The first transistor T1 may be diode-connected by the third transistor T3 thus turned on and may be forward-biased. Also, the second transistor T2 may be turned on by the scan signal GWj having the low level. In this case, a compensation voltage (Di-Vth) obtained by subtracting a threshold voltage (Vth) of the first transistor T1 from a voltage of the data signal Di supplied from the data line DLi may be applied to the gate electrode of the first transistor T1. That is, a gate voltage applied to the gate electrode of the first transistor T1 may be the compensation voltage (Di-Vth).

The first driving voltage ELVDD and the compensation voltage (Di-Vth) may be respectively applied to opposite ends of the capacitor Cst, and charges corresponding to a voltage difference of the opposite ends of the capacitor Cst may be stored in the capacitor Cst.

In an embodiment, the seventh transistor T7 may be turned on in response to the scan signal GWj+1 of the low level transferred through the scan line GWLj+1. As the seventh transistor T7 is turned on, a portion of the driving current Id may be drained through the seventh transistor T7 as a bypass current Ibp.

In a case where the light emitting diode ED emits a light under the condition that a minimum current of the first transistor T1 flows as a driving current for the purpose of displaying a black image, the black image may not be normally displayed. In an embodiment of the disclosure, the seventh transistor T7 of the pixel PXij may distribute a portion of the minimum current of the first transistor T1 to a current path, which is different from a current path to the light emitting diode ED, as the bypass current Ibp. Herein, the minimum current of the first transistor T1 may mean a current flowing under the condition that a gate-source voltage (Vgs) of the first transistor T1 is less than the threshold voltage Vth, that is, under the condition that the first transistor T1 is turned off. As a minimum driving current (e.g., a current of 10 picoampere (pA) or less) is transferred to the light emitting diode ED, in a state where the first transistor T1 is turned off, an image of black luminance may be expressed. When the minimum driving current for displaying a black image flows, the influence of a bypass transfer of the bypass current Ibp may be great; in contrast, when a large driving current for displaying an image such as a normal image or a white image flows, there may be almost no influence of the bypass current Ibp. Accordingly, when a driving current for displaying a black image flows, a light emitting current Ied of the light emitting diode ED, which corresponds to a result of subtracting the bypass current Ibp drained through the sixth transistor T7 from the driving current Id, may have a minimum current amount to such an extent as to accurately express a black image. Accordingly, a contrast ratio may be improved by accurately implementing an image of black luminance by using the seventh transistor T7. In an embodiment, a bypass signal is the scan signal GWj+1 of the low level but is not necessarily limited thereto.

Next, during an emission period, the emission signal EMj supplied from the emission control line EMLj may transition from the high level to the low level. During the emission period, the fifth transistor T5 and the sixth transistor T6 may be turned on by the emission signal EMj having the low level. In this case, the driving current Id may be generated based on a difference between the gate voltage of the gate electrode of the first transistor T1 and the first driving voltage ELVDD and may be supplied to the light emitting diode ED through the sixth transistor T6. That is, the current Ied may flow through the light emitting diode ED.

Figure 9:
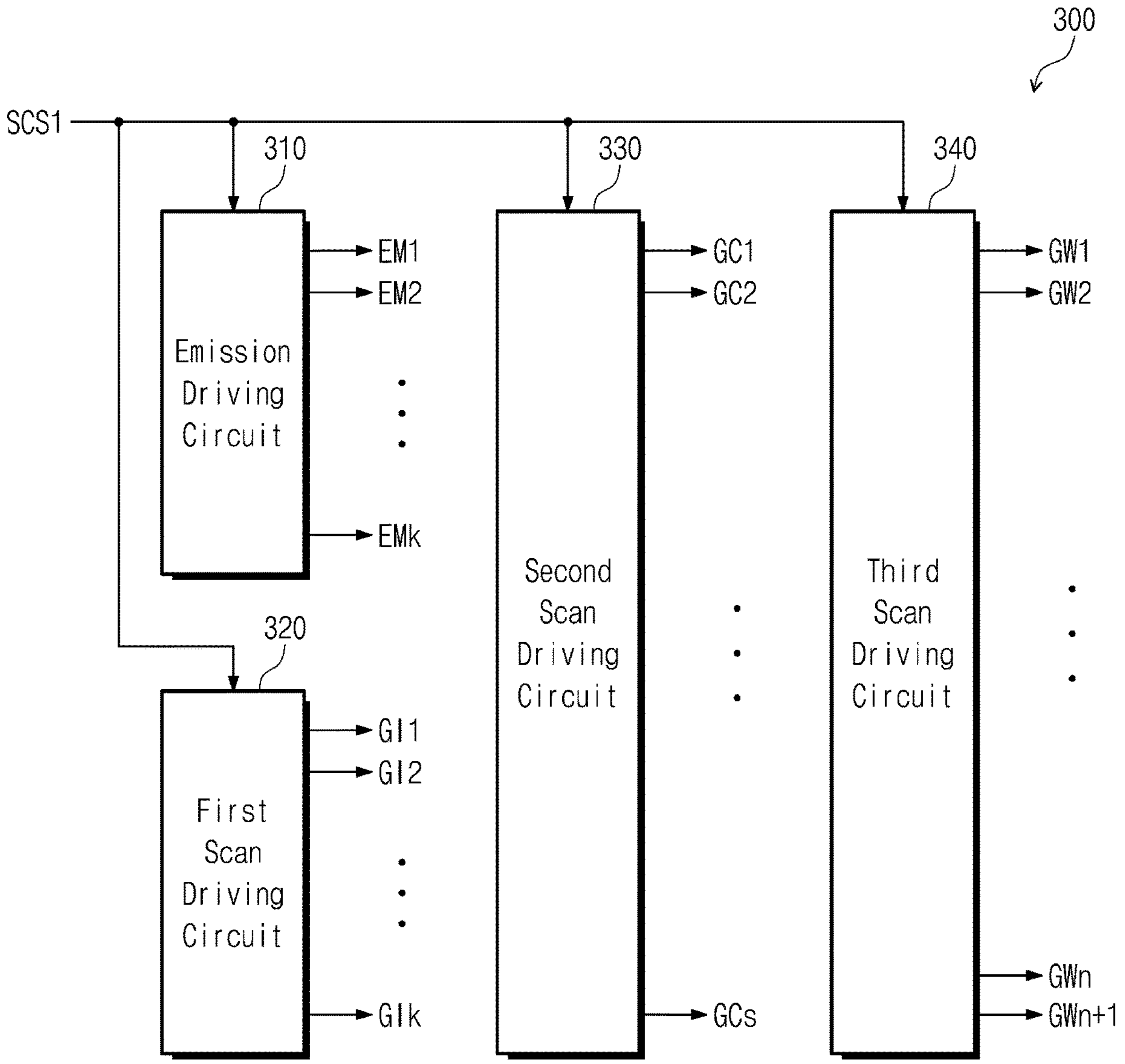
FIG. 9 is a block diagram illustrating a first driving circuit illustrated in FIG. 6, according to an embodiment of the disclosure.

FIG. 9 is a block diagram illustrating a first driving circuit illustrated in FIG. 6, according to an embodiment of the disclosure.

Referring to FIGS. 6 and 9, in an embodiment, the first driving circuit 300 may include an emission driving circuit 310, a first scan driving circuit 320, a second scan driving circuit 330, and a third scan driving circuit 340.

The emission driving circuit 310 may output emission signals EM1 to EMk to be provided to the emission control lines EML1 to EMLn in response to the first scan control signal SCS1. In an embodiment, n may be greater than k, i.e., n>k. That is, each of the emission signals EM1 to EMk may be provided to two or more corresponding emission control lines among the emission control lines EML1 to EMLn.

The first scan driving circuit 320 may output scan signals GI1 to GIk to be provided to the scan lines GIL1 to GILn in response to the first scan control signal SCS1. In an embodiment, n may be greater than k, i.e., n>k. That is, each of the scan signals GI1 to GIk may be provided to two or more corresponding scan lines among the scan lines GIL1 to GILn.

The second scan driving circuit 330 may output scan signals GC1 to GCs to be provided to the scan lines GCL1 to GCLn in response to the first scan control signal SCS1. In an embodiment, n may be greater than s, i.e., n>s. That is, each of the scan signals GC1 to GCs may be provided to two or more corresponding scan lines among the scan lines GCL1 to GCLn.

The third scan driving circuit 340 may output scan signals GW1 to $GWn_{+1}$ to be provided to the scan lines GWL1 to GWLn+1 in response to the first scan control signal SCS1.

Figure 10:
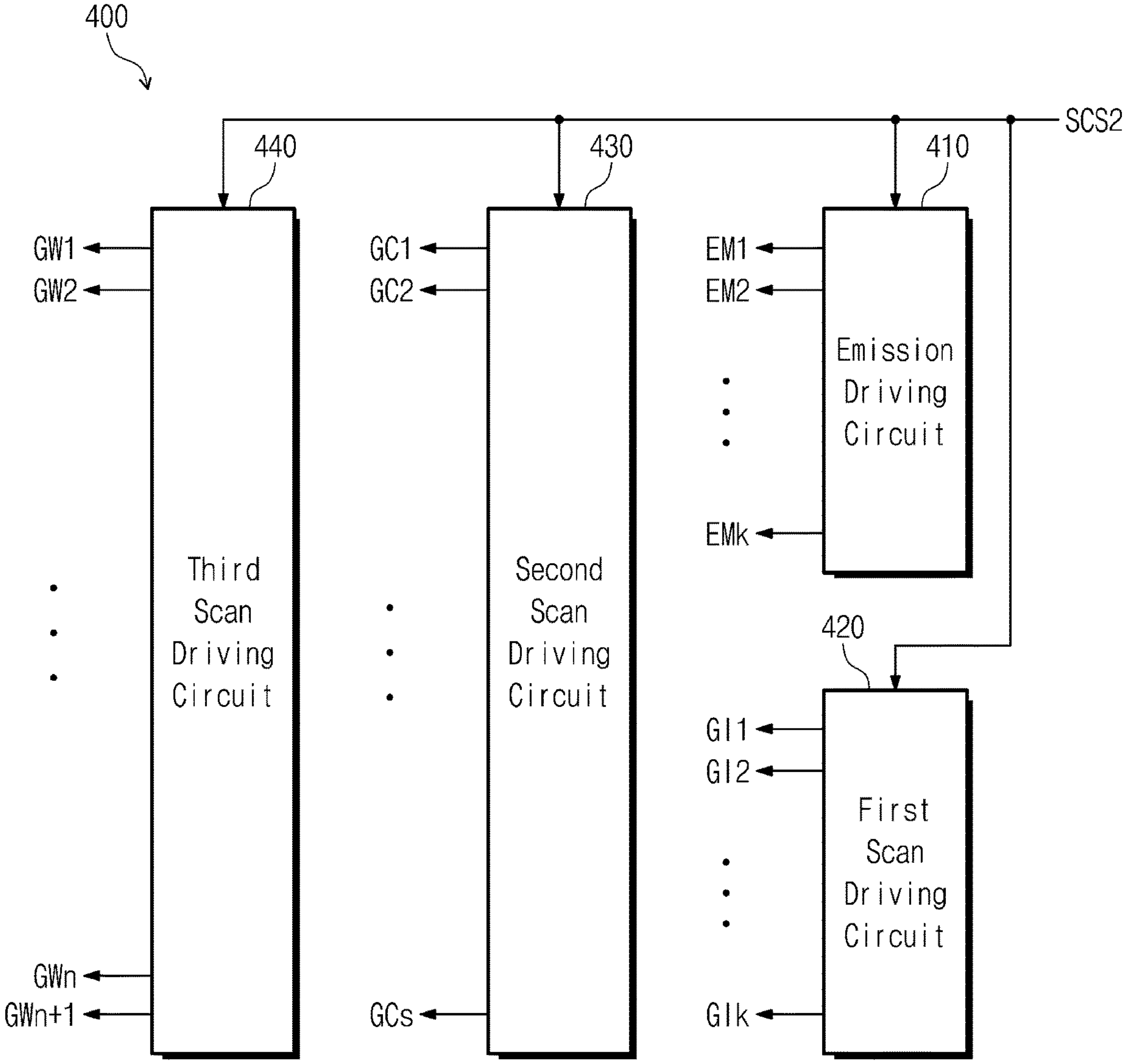
FIG. 10 is a block diagram illustrating a second driving circuit illustrated in FIG. 6, according to an embodiment of the disclosure.

FIG. 10 is a block diagram illustrating a second driving circuit illustrated in FIG. 6, according to an embodiment of the disclosure.

Referring to FIGS. 6 and 10, in an embodiment, the second driving circuit 400 may include an emission driving circuit 410, a first scan driving circuit 420, a second scan driving circuit 430, and a third scan driving circuit 440.

The emission driving circuit 410 may output the emission signals EM1 to EMk to be provided to the emission control lines EML1 to EMLn in response to the second scan control signal SCS2.

The first scan driving circuit 420 may output the scan signals GI1 to GIk to be provided to the scan lines GIL1 to GILn in response to the second scan control signal SCS2.

The second scan driving circuit 430 may output the scan signals GC1 to GCs to be provided to the scan lines GCL1 to GCLn in response to the second scan control signal SCS2.

The third scan driving circuit 440 may output the scan signals GW1 to $GWn_{+1}$ to be provided to the scan lines GWL1 to $GWLn_{+1}$ in response to the second scan control signal SCS2.

Figure 11:
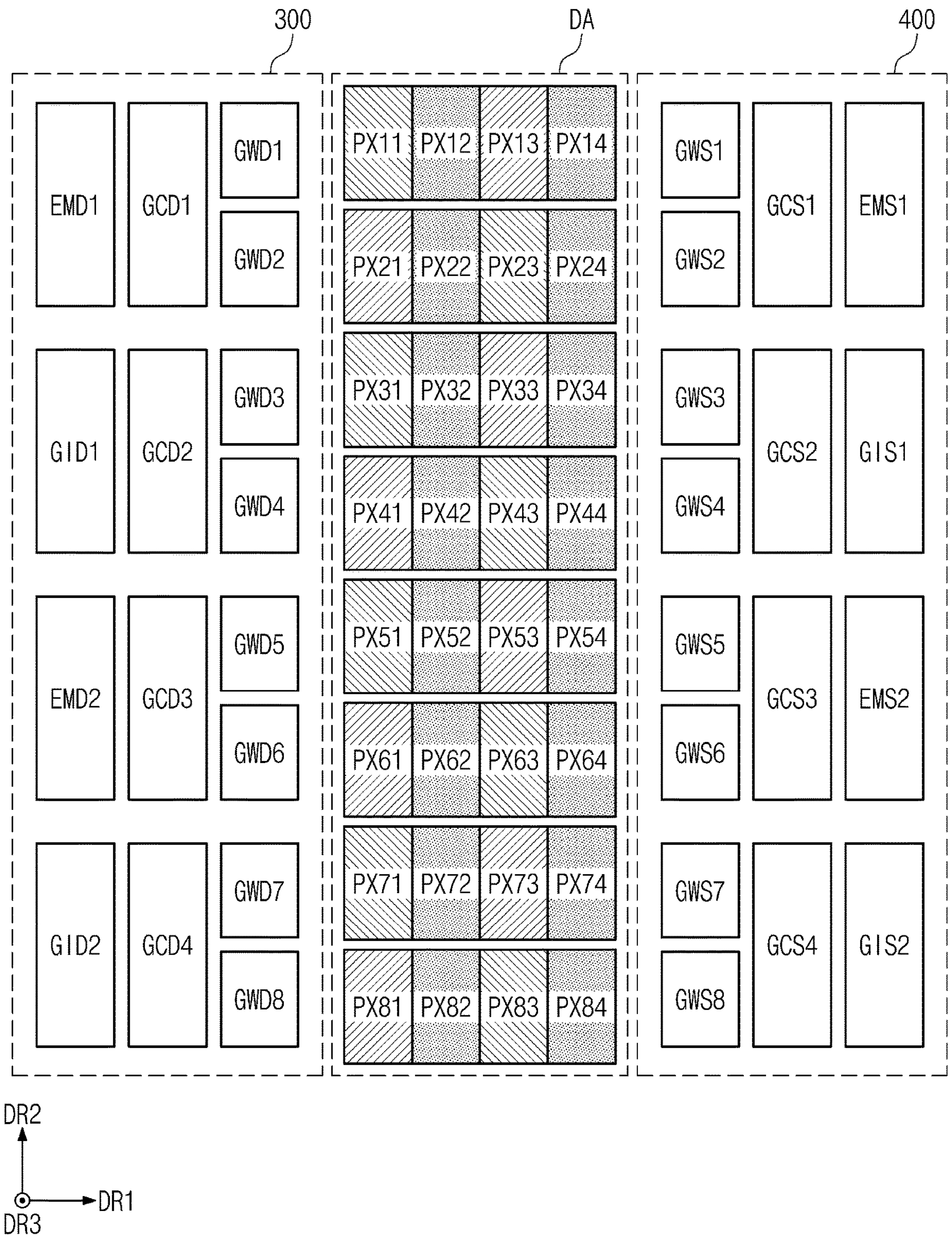
FIG. 11 is a block diagram illustrating a first driving circuit and a second driving circuit according to an embodiment of the disclosure.

FIG. 11 is a block diagram illustrating a first driving circuit and a second driving circuit according to an embodiment of the disclosure.

Referring to FIGS. 9 to 11, pixels PX11 to PX14, PX21 to PX24, PX31 to PX34, PX41 to PX44, PX51 to PX54, PX61 to PX64, PX71 to PX74, and PX81 to PX84 may be disposed in the display area DA.

For convenience of illustration and description, an example of a display area DA in which pixels are arranged in a matrix with eight rows and four columns (or in a matrix where four pixels are disposed in the first direction DR1 for each row and eight pixels are disposed in the second direction DR2 for each column) is illustrated in FIG. 11, but the number of pixels included in the display panel DP may be variously changed or modified.

The pixels PX11, PX23, PX31, PX43, PX51, PX63, PX71, and PX83 may be first color pixels (e.g., red pixels); the pixels PX13, PX21, PX33, PX41, PX53, PX61, PX73 and PX81 may be second color pixels (e.g., blue pixels); and, the remaining pixels PX12, PX14, PX22, PX24, PX32, PX34, PX42, PX44, PX52, PX54, PX62, PX64, PX72, PX74, PX82, and PX84 may be third color pixels (e.g., green pixels).

The emission driving circuit 310 in the first driving circuit 300 includes emission stages EMD1 and EMD2. The first scan driving circuit 320 in the first driving circuit 300 includes first scan stages GID1 and GID2. The second scan driving circuit 330 in the first driving circuit 300 includes second scan stages GCD1 to GCD4. The third scan driving circuit 340 in the first driving circuit 300 includes third scan stages GWD1 to GWD8.

Each of the emission stages EMD1 and EMD2 may drive four rows of pixels PX11 to PX14, PX21 to PX24, PX31 to PX34, and PX41 to PX44.

Each of the first scan stages GID1 and GID2 may drive four rows of pixels PX11 to PX14, PX21 to PX24, PX31 to PX34, and PX41 to PX44.

Each of the second scan stages GCD1 to GCD4 may drive two rows of pixels PX11 to PX14, PX21 to PX24, PX31 to PX34, and PX41 to PX44.

Each of the third scan stages GWD1 to GWD8 may drive one row of pixels PX11 to PX14, PX21 to PX24, PX31 to PX34, and PX41 to PX44.

In an embodiment, lengths in the second direction DR2 of circuit areas where the emission stages EMD1 and EMD2, the first scan stages GID1 and GID2, and the second scan stages GCD1 to GCD4 are respectively disposed may be substantially identical to each other. In an embodiment, sizes (e.g., planer areas) of circuit areas where the emission stages EMD1 and EMD2, the first scan stages GID1 and GID2, and the second scan stages GCD1 to GCD4 are respectively disposed may be substantially identical as each other.

In an embodiment, a length of circuit areas occupied by the third scan stages GWD1 to GWD8 in the second direction DR2 may be half the length of circuit areas occupied by the second scan stages GCD1 to GCD4 in the second direction DR2. In an embodiment, a size of each of circuit areas where the third scan stages GWD1 to GWD8 are respectively disposed may be smaller than a size of each of circuit areas where the emission stages EMD1 and EMD2, the first scan stages GID1 and GID2, and the second scan stages GCD1 to GCD4 are respectively disposed.

The emission driving circuit 410 in the second driving circuit 400 includes emission stages EMS1 and EMS2. The first scan driving circuit 420 in the second driving circuit 400 includes first scan stages GIS1 and GIS2. The second scan driving circuit 430 in the second driving circuit 400 includes second scan stages GCS1 to GCS4. The third scan driving circuit 440 in the second driving circuit 400 includes third scan stages GWS1 to GWS8.

Each of the emission stages EMS1 and EMS2 may drive four rows of pixels PX11 to PX14, PX21 to PX24, PX31 to PX34, and PX41 to PX44.

Each of the first scan stages GIS1 and GIS2 may drive four rows of pixels PX11 to PX14, PX21 to PX24, PX31 to PX34, and PX41 to PX44.

Each of the second scan stages GCS1 to GCS4 may drive two rows of pixels PX11 to PX14, PX21 to PX24, PX31 to PX34, and PX41 to PX44.

Each of the third scan stages GWS1 to GWS8 may drive one row of pixels PX11 to PX14, PX21 to PX24, PX31 to PX34, and PX41 to PX44.

In an embodiment, lengths in the second direction DR2 of the circuit areas where the emission stages EMS1 and EMS2, the first scan stages GIS1 and GIS2, and the second scan stages GCS1 to GCS4 are respectively disposed may be substantially identical to each other. In an embodiment, sizes of circuit areas where the emission stages EMS1 and EMS2, the first scan stages GIS1 and GIS2, and the second scan stages GCS1 to GCS4 are respectively disposed may be substantially identical to each other.

A length of circuit areas occupied by the third scan stages GWS1 to GWS8 in the second direction DR2 may be half the length of circuit areas occupied by the second scan stages GCS1 to GCS4 in the second direction DR2.

A size of each of circuit areas where the third scan stages GWS1 to GWS8 are respectively disposed may be smaller than a size of each of circuit areas where the emission stages EMS1 and EMS2, the first scan stages GIS1 and GIS2, and the second scan stages GCS1 to GCS4 are respectively disposed.

In an embodiment, as illustrated in FIG. 11, the first scan stages GID1 and GID2 and the second scan stages GCD1 to GCD4 may be implemented with independent circuits. In such an embodiment the first scan stages GIS1 and GIS2 and the second scan stages GCS1 to GCS4 may be implemented with independent circuits.

Figure 12:
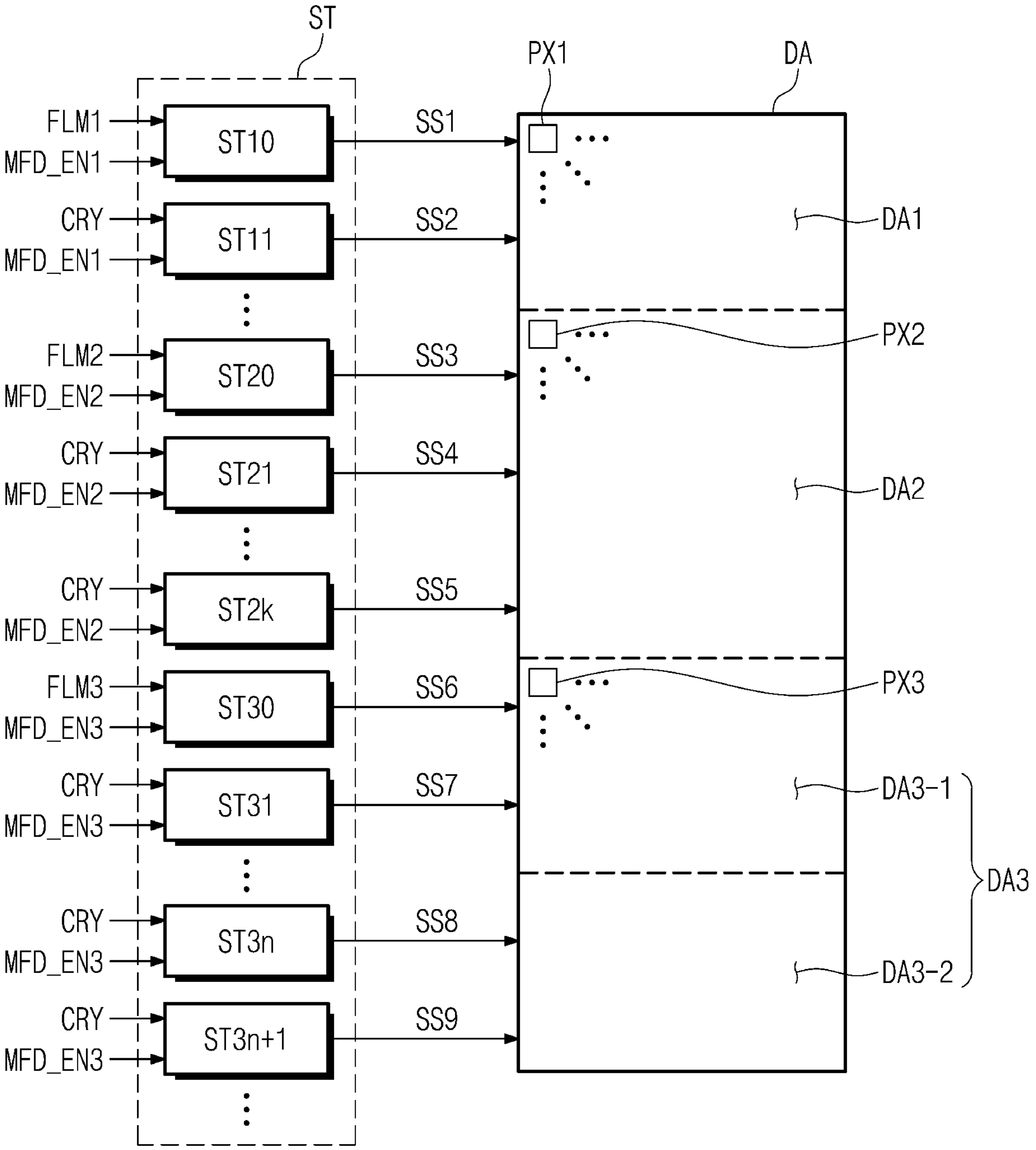
FIG. 12 is a block diagram illustrating a plurality of scan stages and a display area according to an embodiment of the disclosure.
Figure 13:
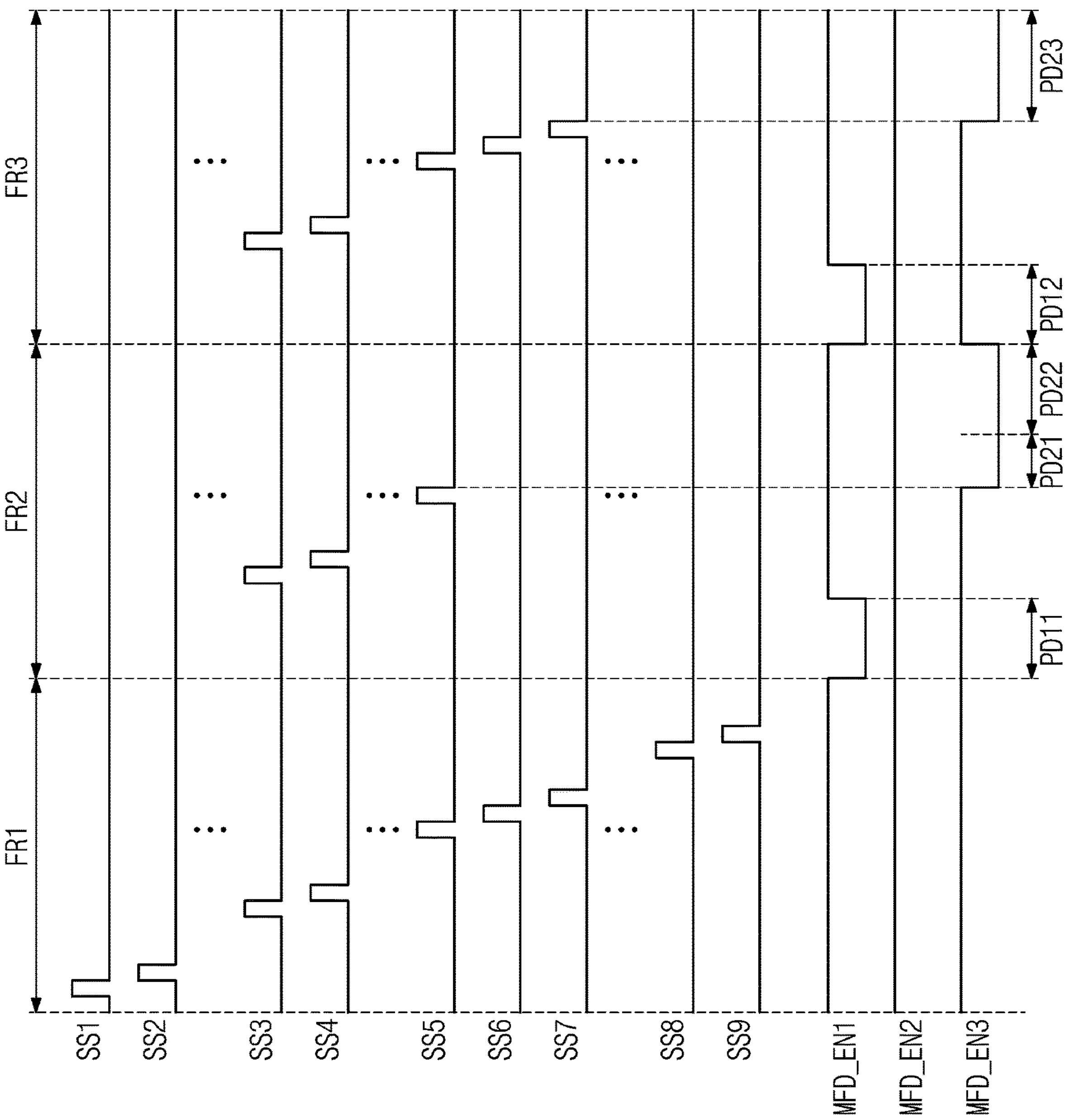
FIG. 13 is a timing diagram illustrating scan signals and masking signals according to an embodiment of the disclosure.
Figure 14:
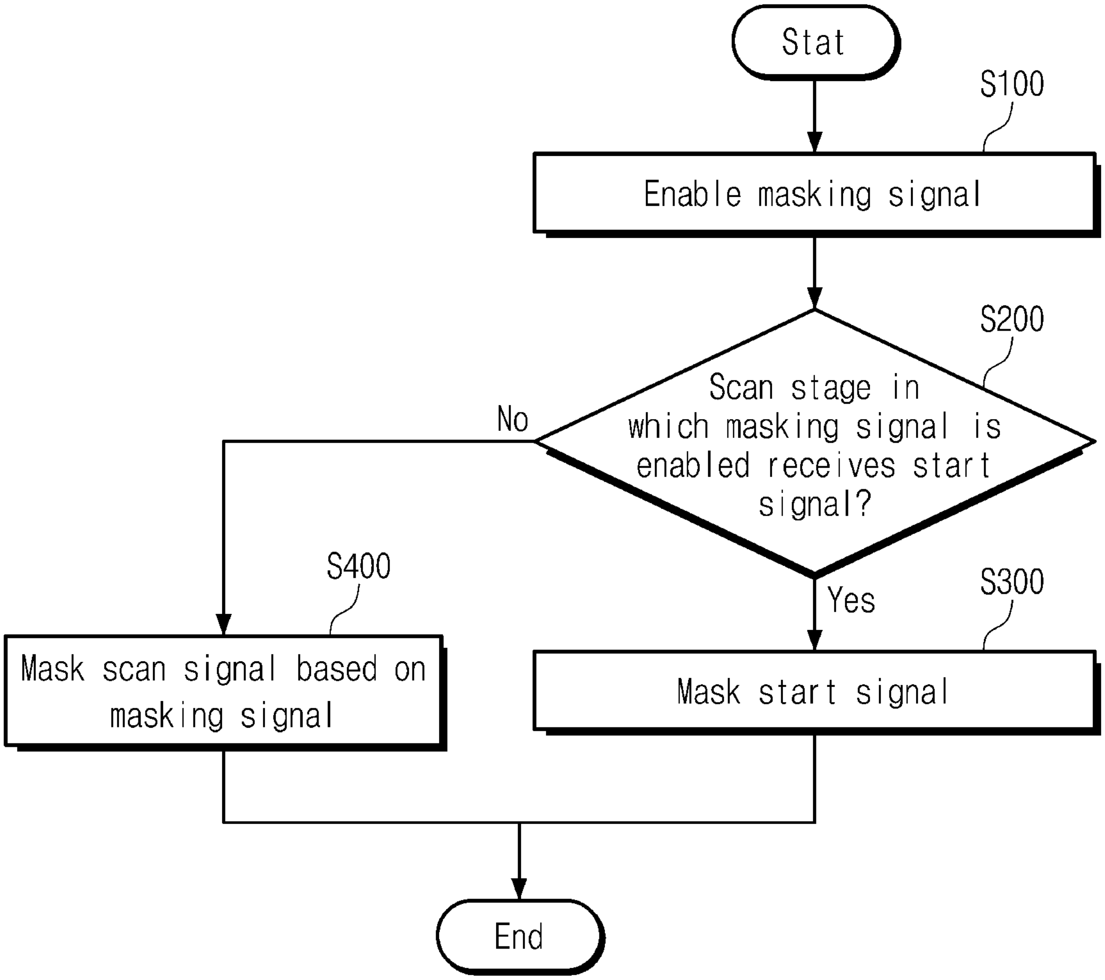
FIG. 14 is a flowchart illustrating an operation of a scan stage according to an embodiment of the disclosure.

FIG. 12 is a block diagram illustrating a plurality of scan stages and a display area according to an embodiment of the disclosure, FIG. 13 is a timing diagram illustrating scan signals and masking signals according to an embodiment of the disclosure, and FIG. 14 is a flowchart illustrating an operation of a scan stage according to an embodiment of the disclosure.

Referring to FIGS. 1, 6, and 11 to 14, in an embodiment, the display panel DP may operate in units of frame. The driving controller 100 may determine a driving frequency of the display panel DP through each of frames FR1, FR2, and FR3. In an embodiment, 120 frames may be provided for 1 second. The frames FR1, FR2, and FR3 may include the first frame FR1, the second frame FR2, and the third frame FR3 that are sequentially provided.

Each of the first scan stages GID1 and GID2 and the second scan stages GCD1 to GCD4 in the first driving circuit 300 and the first scan stages GIS1 and GIS2, and the second scan stages GCS1 to GCS4 in the second driving circuit 400 may include a plurality of scan stages ST.

The plurality of pixels PX may include a plurality of first pixels PX1 disposed in the first display area DA1, a plurality of second pixels PX2 disposed in the second display area DA2, and a plurality of third pixels PX3 disposed in the third display area DA3.

The plurality of scan stages ST may respectively correspond to the plurality of scan lines GIL1 to GILn, GCL1 to GCLn and may be respectively connected thereto.

The plurality of scan stages ST may include a plurality of first scan stages ST10 and ST11, a plurality of second scan stages ST20, ST21, and ST2*k*, and a plurality of third scan stages ST30, ST31, ST3*n*, and ST3*n*+1.

The plurality of first scan stages ST10 and ST11 may be connected to the plurality of first pixels PX1, respectively. The plurality of first scan stages ST10 and ST11 may correspond to the first display area DA1 and may output scan signals SS1 and SS2, respectively. Each of the scan signals SS1 and SS2 may be one of the scan signals GIj and GCj.

Each of the plurality of first scan stages ST10 and ST11 may receive a carry signal CRY and a first masking signal MFD_EN1.

When the first masking signal MFD_EN1 is enabled, the plurality of first scan stages ST10 and ST11 may respectively mask the scan signals SS1 and SS2. That the scan signals SS1 and SS2 are masked may mean that the scan signals SS1 and SS2 are output in a disabled state.

The plurality of first scan stages ST10 and ST11 may include the first first scan stage ST10 and the second first scan stage ST11. Two first scan stages are illustrated in FIG. 12 as an example of the plurality of first scan stages ST10 and ST11, but the number of first scan stages according to an embodiment of the disclosure is not limited thereto. In an embodiment, for example, the number of first scan stages may be determined depending on the first display area DA1.

The start signal FLM output from the driving controller 100 may include a first start signal FLM1, a second start signal FLM2, and a third start signal FLM3.

The first first scan stage ST10 among the plurality of first scan stages ST10 and ST11 may receive the first start signal FLM1 as the carry signal CRY from the driving controller 100.

The first first scan stage ST10 may output the scan signal SS1.

Each of the remaining first scan stages other than the first first scan stage ST10 among the plurality of first scan stages ST10 and ST11 may receive a scan signal of a previous first scan stage as the carry signal CRY.

The second first scan stage ST11 may receive the scan signal SS1 output from the first first scan stage ST10 as the carry signal CRY.

The second first scan stage ST11 may output the scan signal SS2.

In an embodiment of the disclosure, the driving frequency of the first display area DA1 may be 1 Hz.

During the first frame FR1, the first first scan stage ST10 may receive the first start signal FLM1. The first first scan stage ST10 may output the scan signal SS1 in response to the first start signal FLM1.

The second first scan stage ST11 may receive the scan signal SS1 as the carry signal CRY. The second first scan stage ST11 may output the scan signal SS2 in response to the scan signal SS1.

That is, during the first frame FR1, the first image IM1 may be displayed in the first display area DA1.

After the first frame FR1, during the second frame FR2, the driving controller 100 may drive the first display area DA1 with the driving frequency of 1 Hz. In this case, the first masking signal MFD_EN1 may be enabled (S100).

The first masking signal MFD_EN1 may be enabled during a time period PD11 corresponding to the first display area DA1 in the second frame FR2.

In an embodiment, the driving controller 100 may enable the first masking signal MFD_EN1 provided to the first first scan stage ST10 to drive the entire first display area DA1 with 1 Hz.

A scan stage in which the first masking signal MFD_EN1 is enabled may be the first first scan stage ST10 receiving the first start signal FLM1 (S200). In this case, the driving controller 100 may mask the first start signal FLM1 (S300). That is, the first start signal FLM1 may be disabled and may be provided to the first first scan stage ST10.

After the second frame FR2, during the third frame FR3, the driving controller 100 may enable the first masking signal MFD_EN1 for the purpose of driving the first display area DA1 by using the driving frequency of 1 Hz (S100).

The first masking signal MFD_EN1 may be enabled during a time period PD12 corresponding to the first display area DA1 in the third frame FR3.

In an embodiment, the driving controller 100 may enable the first masking signal MFD_EN1 provided to the first first scan stage ST10, which is the forwardmost first scan stage among the plurality of first scan stages ST10 and ST11, to drive the entire first display area DA1 with 1 Hz.

A scan stage in which the first masking signal MFD_EN1 is enabled may be the first first scan stage ST10 receiving the first start signal FLM1 (S200). In this case, the driving controller 100 may mask the first start signal FLM1 (S300). That is, the first start signal FLM1 may be disabled and may be provided to the first first scan stage ST10.

That is, the first image IM1 may be displayed in the first display area DA1 only in the first frame FR1, and the first image IM1 may not be displayed in the remaining frames FR2 and FR3. The first image IM1 may be a status image indicating status information with a long change period. In an embodiment, for example, the first image IM1 may be displayed only in the first frame FR1 among the 120 frames FR1, FR2, FR3, etc. provided for 1 second; in the remaining frames, the first display area DA1 in which the first image IM1 is not displayed may be driven substantially with the driving frequency of 1 Hz.

According to an embodiment of the disclosure, the driving controller 100 may drive the first display area DA1, in which the first image IM1 with a long change period is displayed, with a driving frequency lower than a driving frequency of a display area in which a video is displayed. As the display device DD makes the driving frequency of the first display area DA1 low, during a time period where the first image IM1 is not displayed, the display device DD may not generate the image data signal DATA and may not perform compensating processing. Also, in this case, the data driving circuit 200 may operate in a power-saving mode. Accordingly, the display device DD in which power consumption is reduced may be provided.

The plurality of second scan stages ST20 and ST21 to ST2*k* may be connected to the plurality of second pixels PX2. The plurality of second scan stages ST20 and ST21 to ST2*k* may correspond to the second display area DA2 and may output scan signals SS3, SS4, and SS5. The scan signals SS3, SS4, and SS5 may be one of the scan signals GIj and GCj. In this case, "k" may be a natural number greater than 1.

Each of the plurality of second scan stages ST20 and ST21 to ST2*k* may receive the carry signal CRY and a second masking signal MFD_EN2.

When the second masking signal MFD_EN2 is enabled, the plurality of second scan stages ST20 and ST21 to ST2*k* may respectively mask the scan signals SS3, SS4, and SS5. That the scan signals SS3, SS4, and SS5 are masked may mean that the scan signals SS3, SS4, and SS5 are output in a disabled state.

The plurality of second scan stages ST20, ST21, and ST2*k* may include the first second scan stage ST20, the second second scan stage ST21, and the k-th second scan stage (or the last or rearmost second scan stage) ST2*k* arranged in this order. Three second scan stages are illustrated in FIG. 12 as an example of the plurality of second scan stages ST20, ST21, and ST2*k*, but the number of second scan stages according to an embodiment of the disclosure is not limited thereto. In an embodiment, for example, the number of second scan stages may be determined depending on the second display area DA2.

The first second scan stage ST20 among the plurality of second scan stages ST20, ST21, and ST2*k* may receive the second start signal FLM2 as the carry signal CRY from the driving controller 100.

When a scan signal is output from the last first scan stage among the plurality of first scan stages ST10 and ST11, the second start signal FLM2 may be output to the first second scan stage ST20.

The first second scan stage ST20 may output the scan signal SS3.

Each of the remaining second scan stages other than the first second scan stage ST20 among the plurality of second scan stages ST20, ST21, and ST2*k* may receive a scan signal of a previous second scan stage as the carry signal CRY.

The second second scan stage ST21 may receive the scan signal SS3 output from the first second scan stage ST20 as the carry signal CRY.

The second second scan stage ST21 may output the scan signal SS4.

The k-th second scan stage ST2*k* may receive a scan signal output from a previous second scan stage as the carry signal CRY.

The k-th second scan stage ST2*k* may output the scan signal SS5.

In an embodiment of the disclosure, the driving frequency of the second display area DA2 may be 120 Hz.

During the first frame FR1, when a scan signal is output from the last first scan stage of the first display area DA1, the first second scan stage ST20 may receive the second start signal FLM2. The first second scan stage ST20 may output the scan signal SS3 in response to the second start signal FLM2.

The second second scan stage ST21 may receive the first scan signal SS3 as the carry signal CRY. The second second scan stage ST21 may output the scan signal SS4 in response to the scan signal SS3.

The second second scan stage ST21 to the k-th second scan stage ST2*k* may be sequentially driven.

The k-th second scan stage ST2*k* may receive a scan signal received from a previous second scan stage as the carry signal CRY. The k-th second scan stage ST2*k* may output the scan signal SS5 in response to the scan signal.

After the first frame FR1, during the second frame FR2, the driving controller 100 may drive the second display area DA2 with the driving frequency of 120 Hz. In this case, the second masking signal MFD_EN2 may be disabled.

When a scan signal is output from the last first scan stage of the first display area DA1, the first second scan stage ST20 may receive the second start signal FLM2. The first second scan stage ST20 may output the scan signal SS3 in response to the second start signal FLM2.

The second second scan stage ST21 may receive the scan signal SS3 as the carry signal CRY. The second second scan stage ST21 may output the scan signal SS4 in response to the scan signal SS3.

The k-th second scan stage ST2*k* may receive a scan signal received from a previous second scan stage as the carry signal CRY. The k-th second scan stage ST2*k* may output the scan signal SS5 in response to the scan signal.

After the second frame FR2, during the third frame FR3, the driving controller 100 may drive the second display area DA2 with the driving frequency of 120 Hz. In this case, the second masking signal MFD_EN2 may be disabled.

When a scan signal is output from the last first scan stage of the first display area DA1, the first second scan stage ST20 may receive the second start signal FLM2. The first second scan stage ST20 may output the scan signal SS3 in response to the second start signal FLM2.

The second second scan stage ST21 may receive the scan signal SS3 as the carry signal CRY. The second second scan stage ST21 may output the scan signal SS4 in response to the scan signal SS3.

The second second scan stage ST21 to the k-th second scan stage ST2*k* may be sequentially driven.

The k-th second scan stage ST2*k* may receive a scan signal received from a previous second scan stage as the carry signal CRY. The k-th second scan stage ST2*k* may output the scan signal SS5 in response to the scan signal.

That is, in each of the first frame FR1 to the third frame FR3, the second image IM2 may be displayed in the second display area DA2. The second image IM2 may be a video. In an embodiment, for example, the second image IM2 may be displayed in all the 120 frames FR1, FR2, FR3, etc. provided for 1 second. This may mean that the second display area DA2 is substantially driven with the driving frequency of 120 Hz.

According to an embodiment of the disclosure, the driving controller 100 may allow the second display area DA2, in which the second image IM2 with a short change period is displayed, to operate with a relatively high driving frequency. The user may be smoothly provided with the second image IM2 through the display device DD. Accordingly, the display device DD whose display quality is improved may be provided.

The plurality of third scan stages ST30, ST31 to ST3*n*, and ST3*n*+1 may be connected to the plurality of third pixels PX3. The plurality of third scan stages ST30, ST31 to ST3*n*, and ST3*n*+1 may correspond to the third display area DA3 and may output scan signals SS6, SS7, SS8, and SS9. Each of the signals SS6, SS7, SS8, and SS9 may be one of the scan signals GIj and GCj. In this case, "n" may be a natural number greater than 1.

Each of the plurality of third scan stages ST30, ST31 to ST3*n*, and ST3*n*+1 may receive the carry signal CRY and a third masking signal MFD_EN3.

When the third masking signal MFD_EN3 is enabled, the plurality of third scan stages ST30, ST31 to ST3*n*, and ST3*n*+1 may respectively mask the scan signals SS6, SS7, SS8, and SS9. That the scan signals SS6, SS7, SS8, and SS9 are masked may mean that the scan signals SS6, SS7, SS8, and SS9 are output in a disabled state.

The plurality of third scan stages ST30, ST31 to ST3*n*, and ST3*n*+1 may include the first third scan stage ST30, the second third scan stage ST31, the n-th third scan stage ST3*n*, and the (n+1)-th third scan stage STn+1 arranged in this order. Four third scan stages are illustrated in FIG. 12 as an example of the plurality of third scan stages ST30, ST31 to ST3*n*, and ST3*n*+1, but the number of third scan stages according to an embodiment of the disclosure is not limited thereto. In an embodiment, for example, the number of third scan stages may be determined depending on the third display area DA3.

The first third scan stage ST30 among the plurality of third scan stages ST30, ST31 to ST3*n*, and ST3*n*+1 may receive the third start signal FLM3 as the carry signal CRY from the driving controller 100.

When a scan signal is output from the k-th second scan stage ST2*k* among the plurality of second scan stages ST20, ST21, and ST2*k*, the third start signal FLM3 may be output to the first third scan stage ST30.

The first third scan stage ST30 may output the scan signal SS6.

Each of the remaining third scan stages other than the first third scan stage ST30 among the plurality of third scan stages ST30, ST31 to ST3*n*, and ST3*n*+1 may receive a scan signal of a previous third scan stage as the carry signal CRY.

The second third scan stage ST31 may receive the scan signal SS6 output from the first third scan stage ST30 as the carry signal CRY.

The second third scan stage ST31 may output the scan signal SS7.

The n-th third scan stage ST3*n* may receive a scan signal output from a previous third scan stage as the carry signal CRY.

The n-th third scan stage ST3*n* may output the scan signal SS8.

The (n+1)-th third scan stage ST3*n*+1 may receive the scan signal SS8 output from the n-th third scan stage ST3*n* as the carry signal CRY.

The 3-(n+1)-3-rd scan stage ST3*n*+1 may output the scan signal SS9.

In an embodiment of the disclosure, a first third display area DA3-1 and a second third display area DA3-2 adjacent to the first third display area DA3-1 may be defined in the third display area DA3. In an embodiment, for example, the first scan stage of the first third display area DA3-1 may be the first third scan stage ST30, and the first scan stage of the second third display area DA3-2 may be the n-th third scan stage ST3*n*. In an embodiment, for example, the first third display area DA3-1 may correspond to the first sub-display area AA1 (refer to FIG. 5), and the second third display area DA3-2 may correspond to the second sub-display area AA2 (refer to FIG. 5).

During the multi-frequency mode MFM, the driving controller 100 may control the first third display area DA3-1 and the second third display area DA3-2 by using the third masking signal MFD_EN3 to operate with different driving frequencies.

In an embodiment of the disclosure, the driving frequency of the first third display area DA3-1 may be 60 Hz.

During the first frame FR1, when a scan signal is output from the k-th second scan stage ST2*k* being the last second scan stage ST2*k* of the second display area DA2, the first third scan stage ST30 may receive the third start signal FLM3. The first third scan stage ST30 may output the scan signal SS6 in response to the third start signal FLM3.

The second third scan stage ST31 may receive the scan signal SS6 from the first third scan stage ST30 as the carry signal CRY. The second third scan stage ST31 may output the scan signal SS7 in response to the scan signal SS6.

The second third scan stage ST31 to the (n−1)-th third scan stage may be sequentially driven.

After the first frame FR1, during the second frame FR2, the driving controller 100 may drive the first third display area DA3-1 with the driving frequency of 60 Hz. In this case, the third masking signal MFD_EN3 may be enabled (S100).

In the second frame FR2, the third masking signal MFD_EN3 may be enabled during a time period PD21 corresponding to the first third display area DA3-1.

In an embodiment, the driving controller 100 may enable the third masking signal MFD_EN3 provided to the first third scan stage ST30 to drive the first third display area DA3-1 with 60 Hz.

A scan stage in which the third masking signal MFD_EN3 is enabled may be the first third scan stage ST30 receiving the third start signal FLM3 (S200). In this case, the driving controller 100 may mask the third start signal FLM3 (S300). That is, the third start signal FLM3 may be disabled and may be provided to the first third scan stage ST30.

After the second frame FR2, during the third frame FR3, the driving controller 100 may disable a portion of the third masking signal MFD_EN3 for the purpose of driving the first third display area DA3-1 with the driving frequency of 60 Hz.

When a scan signal is output from the k-th second scan stage ST2*k* being the last second scan stage ST2*k* of the second display area DA2, the first third scan stage ST30 may receive the third start signal FLM3. The first third scan stage ST30 may output the scan signal SS6 in response to the third start signal FLM3.

The second third scan stage ST31 may receive the scan signal SS6 from the first third scan stage ST30 as the carry signal CRY. The second third scan stage ST31 may output the scan signal SS7 in response to the scan signal SS6.

The second third scan stage ST31 to the (n−1)-th third scan stage may be sequentially driven.

In the first third display area DA3-1, a portion of the third image IM3 may be displayed only in the odd-numbered frames FR1 and FR3, and the third image IM3 may not be displayed in the remaining frames including the frame FR2. The third image IM3 may be an image with a long change period, such as a keyboard image or a controller image. In an embodiment, for example, the third image IM3 may be alternately displayed in the 120 frames FR1, FR2, FR3, etc. provided for 1 second. This may mean that the first third display area DA3-1 is substantially driven by using the driving frequency of 60 Hz.

According to an embodiment of the disclosure, the driving controller 100 may drive the first third display area DA3-1, in which a portion of the third image IM3 with a long change period is displayed, with a driving frequency lower than a driving frequency of a display area in which a video is displayed. As the display device DD makes the driving frequency of the first third display area DA3-1 low, during a time period where a portion of the third image IM3 is not displayed, the display device DD may not generate the image data signal DATA and may not perform compensating processing. Also, in this case, the data driving circuit 200 may operate in a power-saving mode. Accordingly, the display device DD in which power consumption is reduced may be provided.

In an embodiment of the disclosure, the driving frequency of the second third display area DA3-2 may be 1 Hz.

During the first frame FR1, the n-th third scan stage ST3*n* may receive a scan signal from a previous third scan stage. The n-th third scan stage ST3*n* may output the scan signal SS8 in response to the scan signal.

The (n+1)-th third scan stage STn+1 may receive the scan signal SS8 as the carry signal CRY. The (n+1)-th third scan stage STn+1 may output the scan signal SS9 in response to the scan signal SS8.

The (n+1)-th third scan stage STn+1 to the last third scan stage may be sequentially driven.

After the first frame FR1, during the second frame FR2, the driving controller 100 may drive the second third display area DA3-2 with the driving frequency of 1 Hz. In this case, the third masking signal MFD_EN3 may be enabled (S100).

In the second frame FR2, the third masking signal MFD_EN3 may be enabled during a time period PD22 corresponding to the second third display area DA3-2.

In an embodiment, the driving controller 100 may enable the third masking signal MFD_EN3 provided to the n-th third scan stage ST3*n* to drive the entire second third display area DA3-2 with 1 Hz.

A scan stage in which the third masking signal MFD_EN3 is enabled may be the n-th third scan stage ST3*n* not receiving the third start signal FLM3. In this case, the driving controller 100 may mask the scan signal SS8 based on the third masking signal MFD_EN3 (S400).

After the second frame FR2, during the third frame FR3, the driving controller 100 may enable the third masking signal MFD_EN3 for the purpose of driving the second third display area DA3-2 with the driving frequency of 1 Hz (S100).

In the third frame FR3, the third masking signal MFD_EN3 may be enabled during a time period PD23 corresponding to the second third display area DA3-2.

A scan stage in which the third masking signal MFD_EN3 is enabled may be the n-th third scan stage ST3*n* not receiving the third start signal FLM3. In this case, the driving controller 100 may mask the scan signal SS8 based on the third masking signal MFD_EN3 (S400).

That is, in the second third display area DA3-2, the remaining portion of the third image IM3 may be displayed only in the first frame FR1, and the third image IM3 may not be displayed in the remaining frames FR2 and FR3. The remaining portion of the third image IM3 may be a bottom information bar indicating status information with a long change period. In an embodiment, for example, the remaining portion of the third image IM3 may be displayed only in the first frame FR1 among the 120 frames FR1, FR2, FR3, etc. provided for 1 second; in the remaining frames, the second third display area DA3-2 in which the third image IM3 is not displayed may be driven substantially by using the driving frequency of 1 Hz.

According to an embodiment of the disclosure, the driving controller 100 may drive the second third display area DA3-2, in which the remaining portion of the third images IM3 with a long change period is displayed, with a driving frequency lower than a driving frequency of a display area in which a video is displayed. As the display device DD makes the driving frequency of the second third display area DA3-2 low, during a time period where the remaining portion of the third images IM3 is not displayed, the display device DD may not generate the image data signal DATA and may not perform compensating processing. Also, in this case, the data driving circuit 200 may operate in a power-saving mode. Accordingly, the display device DD in which power consumption is reduced may be provided.

According to an embodiment of the disclosure, the driving frequency of the first display area DA1 may be lower than the driving frequency of the second display area DA2. The driving frequency of the second display area DA2 may be higher than the driving frequency of the first third display area DA3-1. The driving frequency of the first third display area DA3-1 may be higher than the driving frequency of the second third display area DA3-2. The second third display area DA3-2 may operate by using the same driving frequency as the first display area DA1.

Figure 15:
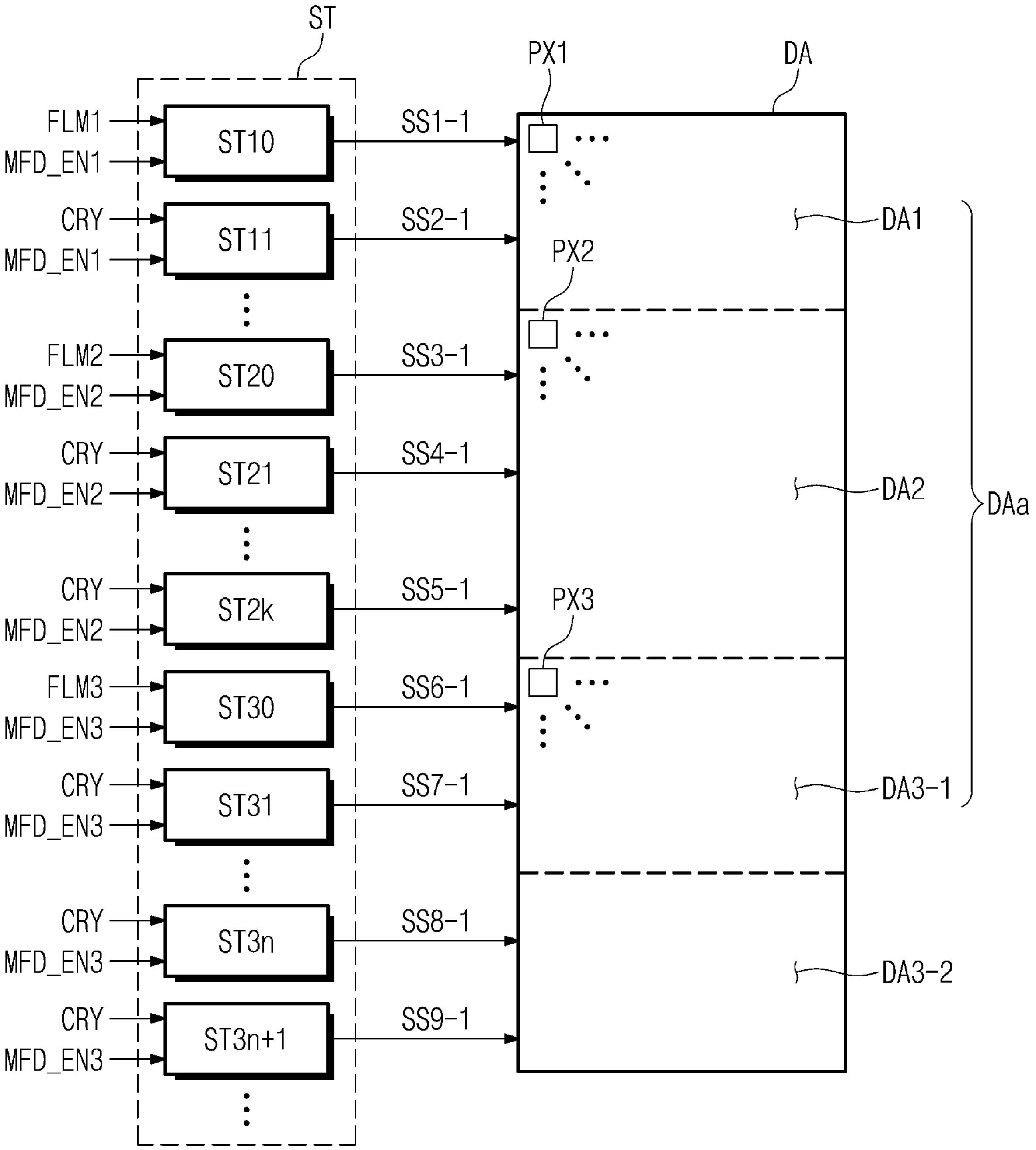
FIG. 15 is a block diagram illustrating a plurality of scan stages and a display area according to an embodiment of the disclosure.
Figure 16:
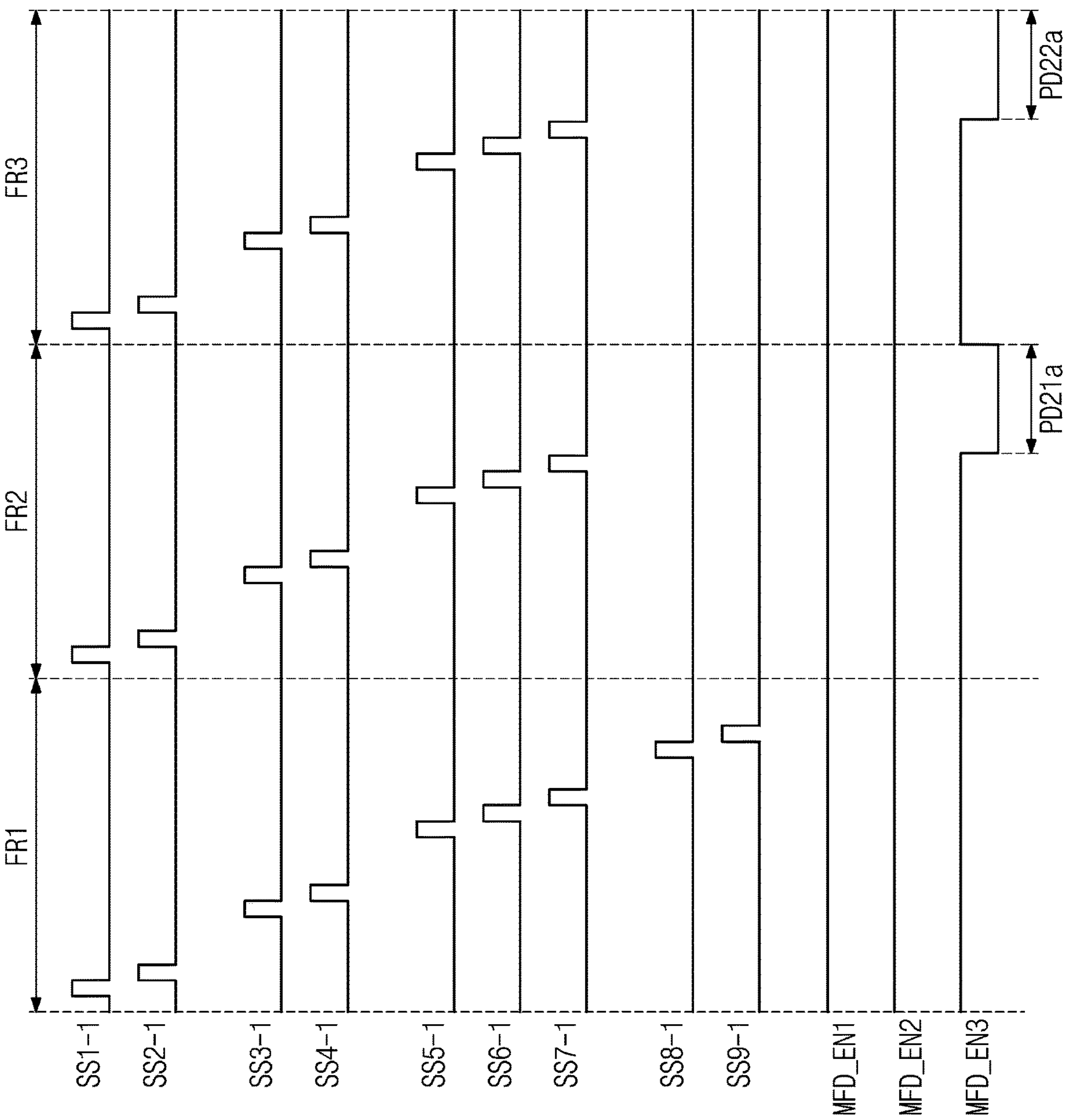
FIG. 16 is a timing diagram illustrating scan signals and masking signals according to an embodiment of the disclosure.

FIG. 15 is a block diagram illustrating a plurality of scan stages and a display area according to an embodiment of the disclosure, and FIG. 16 is a timing diagram illustrating scan signals and masking signals according to an embodiment of the disclosure. In the description of embodiments shown in FIGS. 15 and 16, the same or like components as those described above with reference to FIG. 12 are labeled with the same reference numerals/signs, and any repetitive detailed description thereof will be omitted or simplified.

Referring to FIGS. 1, 6, and 14 to 16, in an embodiment of the disclosure, the driving frequency of the first display area DA1 may be 120 Hz.

In each of the first frame FR1, the second frame FR2, and the third frame FR3, the first first scan stage ST10 may receive the first start signal FLM1. The first first scan stage ST10 may output a scan signal SS1-1 in response to the first start signal FLM1. In this case, the first masking signal MFD_EN1 may be disabled.

The second first scan stage ST11 may receive the scan signal SS1-1 as the carry signal CRY. The second first scan stage ST11 may output a scan signal SS2-1 in response to the scan signal SS1-1.

That is, in each of the first frame FR1, the second frame FR2, and the third frame FR3, the first image IM1 may be displayed in the first display area DAL.

In an embodiment of the disclosure, the driving frequency of the second display area DA2 may be 120 Hz. In this case, the second masking signal MFD_EN2 may be disabled.

In each of the first frame FR1, the second frame FR2, and the third frame FR3, when a scan signal is output from the last first scan stage of the first display area DA1, the first second scan stage ST20 may receive the second start signal FLM2. The first second scan stage ST20 may output a scan signal SS3-1 in response to the second start signal FLM2.

The second second scan stage ST21 may receive the scan signal SS3-1 as the carry signal CRY. The second second scan stage ST21 may output a scan signal SS4-1 in response to the scan signal SS3-1.

The second second scan stage ST21 to the last second scan stage ST2*k* may be sequentially driven.

The k-th second scan stage ST2*k* being the last second scan stage may receive a scan signal from a previous second scan stage as the carry signal CRY. The k-th second scan stage ST2*k* may output a scan signal SS5-1 in response to the scan signal.

That is, in each of the first to third frames FR1, FR2, and FR3, the second image IM2 may be displayed in the second display area DA2.

During the multi-frequency mode MFM, the driving controller 100 may control the first third display area DA3-1 and the second third display area DA3-2 by using the third masking signal MFD_EN3 to operate by using different driving frequencies.

In an embodiment of the disclosure, the driving frequency of the first third display area DA3-1 may be 120 Hz.

In each of the first frame FR1, the second frame FR2, and the third frame FR3, when the scan signal SS5-1 is output from the last second scan stage ST2*k* of the second display area DA2, the first third scan stage ST30 may receive the third start signal FLM3. The first third scan stage ST30 may output a scan signal SS6-1 in response to the third start signal FLM3.

The second third scan stage ST31 may receive the scan signal SS6-1 from the first third scan stage ST30 as the carry signal CRY. The second third scan stage ST31 may output a scan signal SS7-1 in response to the scan signal SS6-1.

The second third scan stage ST31 to the (n−1)-th third scan stage may be sequentially driven.

That is, in the multi-frequency mode MFM, the first display area DA1, the second display area DA2, and the first third display area DA3-1 may operate by using the same driving frequency.

In an embodiment of the disclosure, the driving frequency of the second third display area DA3-2 may be 1 Hz.

During the first frame FR1, the n-th third scan stage ST3*n* may receive a scan signal from a previous third scan stage. The n-th third scan stage ST3*n* may output a scan signal SS8-1 in response to the scan signal.

The (n+1)-th third scan stage STn+1 may receive the scan signal SS8-1 as the carry signal CRY. The (n+1)-th third scan stage STn+1 may output a scan signal SS9-1 in response to the scan signal SS8-1.

The (n+1)-th third scan stage STn+1 to the last third scan stage may be sequentially driven.

After the first frame FR1, during the second frame FR2, the driving controller 100 may drive the second third display area DA3-2 with the driving frequency of 1 Hz. In this case, the third masking signal MFD_EN3 may be enabled (S100).

In the second frame FR2, the third masking signal MFD_EN3 may be enabled during a time period PD21*a* corresponding to the second third display area DA3-2.

In an embodiment, the driving controller 100 may enable the third masking signal MFD_EN3 provided to the n-th third scan stage ST3*n* to drive the entire second third display area DA3-2 with 1 Hz.

A scan stage in which the third masking signal MFD_EN3 is enabled may be the n-th third scan stage ST3*n* not receiving the third start signal FLM3. In this case, the driving controller 100 may mask the scan signal SS8-1 based on the third masking signal MFD_EN3 (S400).

After the second frame FR2, during the third frame FR3, the driving controller 100 may enable the third masking signal MFD_EN3 for the purpose of driving the second third display area DA3-2 with the driving frequency of 1 Hz (S100).

In the third frame FR3, the third masking signal MFD_EN3 may be enabled during a time period PD22*a* corresponding to the second third display area DA3-2.

A scan stage in which the third masking signal MFD_EN3 is enabled may be the n-th third scan stage ST3*n* not receiving the third start signal FLM3. In this case, the driving controller 100 may mask the scan signal SS8-1 based on the third masking signal MFD_EN3 (S400).

That is, in the second third display area DA3-2, a portion of the third image IM3 may be displayed only in the first frame FR1, and the remaining portion of the third image IM3 may not be displayed in the remaining frames FR2 and FR3. In an embodiment, for example, the portion of the third image IM3 may be displayed only in the first frame FR1 among the 120 frames FR1, FR2, FR3, etc. provided for 1 second; in the remaining frames, the second third display area DA3-2 in which the third image IM3 is not displayed may be driven substantially with the driving frequency of 1 Hz.

According to an embodiment of the disclosure, the driving controller 100 may drive a portion of the display area DA with a relatively low driving frequency. During a time period where the display device DD operates with a low driving frequency, the display device DD may not generate the image data signal DATA and may not perform compensation processing. Also, in this case, the data driving circuit 200 may operate in a power-saving mode. Accordingly, the display device DD in which power consumption is reduced may be provided.

An image display area DAa according to an embodiment of the disclosure may include the first display area DA1, the second display area DA2, and the first third display area DA3-1. The driving frequency of the first display area DA1 may be the same as the driving frequency of the second display area DA2 and the first third display area DA3-1. That is, the image display area DAa may operate with the driving frequency of 120 Hz. The driving frequency of the first third display area DA3-1 may be higher than the driving frequency of the second third display area DA3-2.

Figure 17:
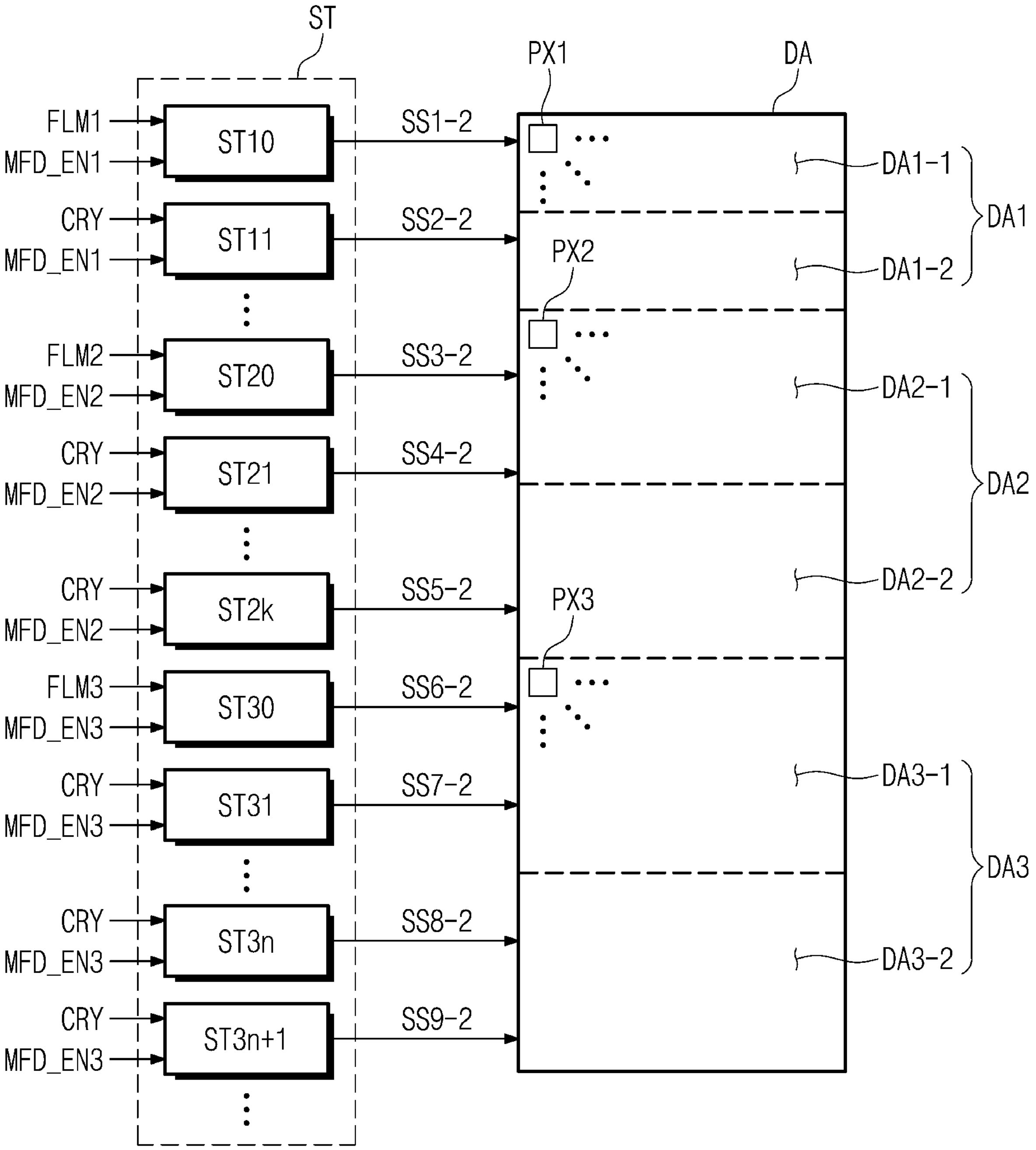
FIG. 17 is a block diagram illustrating a plurality of scan stages and a display area according to an embodiment of the disclosure.
Figure 18:
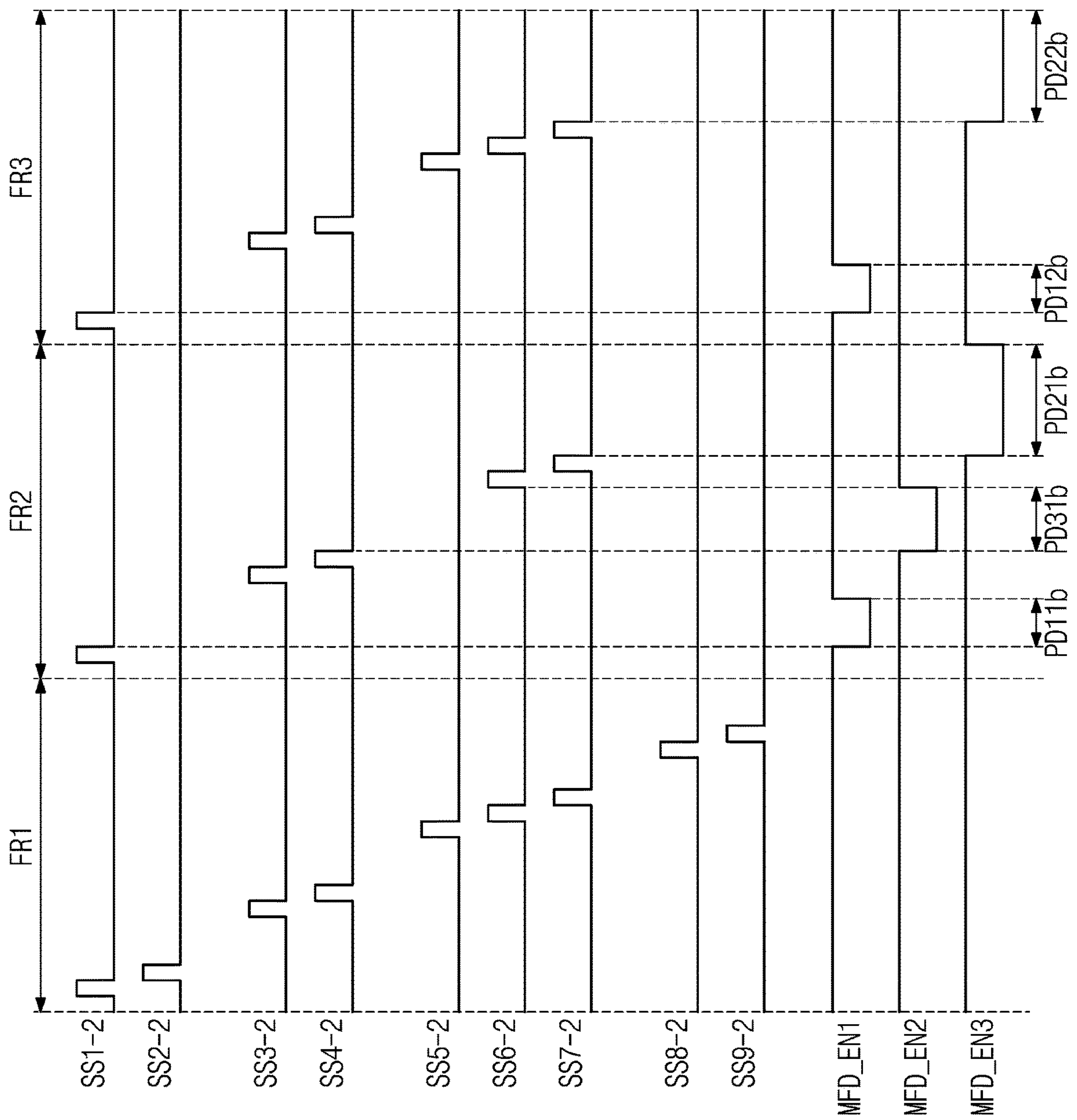
FIG. 18 is a timing diagram illustrating scan signals and masking signals according to an embodiment of the disclosure.

FIG. 17 is a block diagram illustrating a plurality of scan stages and a display area according to an embodiment of the disclosure, and FIG. 18 is a timing diagram illustrating scan signals and masking signals according to an embodiment of the disclosure. In the description of embodiments of FIGS. 17 and 18, the same or like components as those described above with reference to FIG. 12 are labeled with the same reference numerals/signs, and any repetitive detailed description thereof will be omitted or simplified.

Referring to FIGS. 1, 6, 14, 17, and 18, in an embodiment of the disclosure, the first display area DA1 may be divided into a first first display area DA1-1 and a second first display area DA1-2. During the multi-frequency mode MFM, the driving controller 100 may control the first first display area DA1-1 and the second first display area DA1-2 by using the first masking signal MFD_EN1 to operate by using different driving frequencies.

In an embodiment of the disclosure, the driving frequency of the first first display area DA1-1 may be 120 Hz.

In each of the first frame FR1, the second frame FR2, and the third frame FR3, the first first scan stage ST10 may receive the first start signal FLM1. The first first scan stage ST10 may output a scan signal SS1-2 in response to the first start signal FLM1. In this case, the first masking signal MFD_EN1 may be disabled.

In an embodiment of the disclosure, the driving frequency of the second first display area DA1-2 may be 1 Hz.

During the first frame FR1, the second first scan stage ST11 may receive the scan signal SS1-2. The second first scan stage ST11 may output a scan signal SS2-2 in response to the scan signal SS1-2.

After the first frame FR1, during the second frame FR2 and the third frame FR3, the driving controller 100 may drive the second first display area DA1-2 with the driving frequency of 1 Hz. In this case, the first masking signal MFD_EN1 may be enabled (S100).

In the second frame FR2, the first masking signal MFD_EN1 may be enabled during a time period PD11*b* corresponding to the second first display area DA1-2.

In an embodiment, the driving controller 100 may enable the first masking signal MFD_EN1 provided to the second first scan stage ST11 to drive the entire second first display area DA1-2 with 1 Hz.

A scan stage in which the first masking signal MFD_EN1 is enabled may be the second first scan stage ST11 not receiving the first start signal FLM1. In this case, the driving controller 100 may mask the scan signal SS1-2 based on the first masking signal MFD_EN1 (S400).

The second display area DA2 may be divided in a first second display area DA2-1 and a second second display area DA2-2. During the multi-frequency mode MFM, the driving controller 100 may control the first second display area DA2-1 and the second second display area DA2-2 by using the second masking signal MFD_EN2 *s* to operate with different driving frequencies.

In an embodiment of the disclosure, the driving frequency of the first second display area DA2-1 may be 120 Hz.

In each of the first frame FR1, the second frame FR2, and the third frame FR3, the first second scan stage ST20 may receive the second start signal FLM2. The first second scan stage ST20 may output a scan signal SS3-2 in response to the second start signal FLM2. In this case, the second masking signal MFD_EN2 may be disabled.

The second second scan stage ST21 may receive the scan signal SS3-2. The second second scan stage ST21 may output a scan signal SS4-2 in response to the scan signal SS3-2.

In an embodiment of the disclosure, the driving frequency of the second second display area DA2-2 may be 60 Hz.

In the first frame FR1 and the third frame FR3, the k-th second scan stage ST2*k* may receive a scan signal from a previous second scan stage. The k-th second scan stage ST2*k* may output a scan signal SS5-2 in response to the scan signal.

After the first frame FR1, during the second frame FR2, the driving controller 100 may drive the second second display area DA2-2 with the driving frequency of 60 Hz. In this case, the second masking signal MFD_EN2 may be enabled (S100).

In the second frame FR2, the second masking signal MFD_EN2 may be enabled during a time period PD31*b* corresponding to the second second display area DA2-2.

In an embodiment, the driving controller 100 may enable the second masking signal MFD_EN2 provided to the second third scan stage to drive the entire second second display area DA2-2 with 60 Hz.

A scan stage in which the second masking signal MFD_EN2 is enabled may be the second third scan stage not receiving the second start signal FLM2. In this case, the driving controller 100 may mask the scan signal SS4-2 based on the second masking signal MFD_EN2 (S400).

The third display area DA3 may be divided into the first third display area DA3-1 and the second third display area DA3-2. During the multi-frequency mode MFM, the driving controller 100 may control the first third display area DA3-1 and the second third display area DA3-2 by using the third masking signal MFD_EN3 to operate with different driving frequencies.

In an embodiment of the disclosure, the driving frequency of the first third display area DA3-1 may be 120 Hz.

In each of the first frame FR1, the second frame FR2, and the third frame FR3, when the scan signal SS5-2 is output from the last second scan stage ST2*k* of the second display area DA2, the first third scan stage ST30 may receive the third start signal FLM3. The first third scan stage ST30 may output a scan signal SS6-2 in response to the third start signal FLM3.

The second third scan stage ST31 may receive the scan signal SS6-2 from the first third scan stage ST30 as the carry signal CRY. The second third scan stage ST31 may output a scan signal SS7-2 in response to the scan signal SS6-2.

The first third scan stage ST31 to the (n−1)-th third scan stage may be sequentially driven.

In an embodiment of the disclosure, the driving frequency of the second third display area DA3-2 may be 1 Hz.

During the first frame FR1, the n-th third scan stage ST3*n* may receive a scan signal from a previous third scan stage. The n-th third scan stage ST3*n* may output a scan signal SS8-2 in response to the scan signal.

The (n+1)-th third scan stage STn+1 may receive the scan signal SS8-2 as the carry signal CRY. The (n+1)-th third scan stage STn+1 may output a scan signal SS9-2 in response to the scan signal SS8-2.

The (n+1)-3-rd scan stage STn+1 to the last third scan stage may be sequentially driven.

After the first frame FR1, during the second frame FR2 and the third frame FR3, the driving controller 100 may drive the second third display area DA3-2 with the driving frequency of 1 Hz. In this case, the third masking signal MFD_EN3 may be enabled (S100).

In the second frame FR2, the third masking signal MFD_EN3 may be enabled during a time period PD21*b* corresponding to the second third display area DA3-2.

In an embodiment, the driving controller 100 may enable the third masking signal MFD_EN3 provided to the n-th third scan stage ST3*n* to drive the entire second third display area DA3-2 with 1 Hz.

A scan stage in which the third masking signal MFD_EN3 is enabled may be the n-th third scan stage ST3*n* not receiving the third start signal FLM3. In this case, the driving controller 100 may mask the scan signal SS8-2 based on the third masking signal MFD_EN3 (S400).

The number of a plurality of start signals FLM1, FLM2, FLM3 may be equal to half the maximum number of areas operable with different frequencies from each other in the display area DA. In an embodiment, for example, the number of a plurality of start signals FLM1, FLM2, FLM3 may be "3"; in such an embodiment, the display area DA may be divided into a maximum of 6 areas operatable with different driving frequencies from each other.

In an embodiment, for example, the first first display area DA1-1 may correspond to the first sub-display area AA1 (refer to FIG. 5), and the second first display area DA1-2 may correspond to the second sub-display area AA2 (refer to FIG. 5). The first second display area DA2-1 may correspond to the first sub-display area AA1 (refer to FIG. 5), and the second second display area DA2-2 may correspond to the second sub-display area AA2 (refer to FIG. 5). The first third display area DA3-1 may correspond to the first sub-display area AA1 (refer to FIG. 5), and the second third display area DA3-2 may correspond to the second sub-display area AA2 (refer to FIG. 5).

According to embodiments of the disclosure, as described herein, a driving controller may drive a portion of a display area by using a relatively low driving frequency. During a time period where the display device operates with a low driving frequency, the display device may not generate an image data signal and may not perform compensation processing. Also, in such embodiments, a data driving circuit may operate in a power-saving mode, such that a display device in which power consumption is reduced may be provided.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. A display device comprising:

a display panel including a plurality of pixels connected to a plurality of scan lines, wherein a display area including a first display area and a second display area is defined in the display panel;

a scan driving circuit including a plurality of scan stages corresponding to the plurality of scan lines, respectively, wherein each of the plurality of scan stages receives a corresponding one of a plurality of masking signals and a carry signal and outputs a scan signal; and a driving controller which controls the scan driving circuit and outputs a plurality of start signals including a first start signal and a second start signal, wherein the plurality of pixels includes a plurality of first pixels disposed in the first display area and a plurality of second pixels disposed in the second display area, wherein the plurality of scan stages include a plurality of first scan stages connected to the plurality of first pixels and a plurality of second scan stages connected to the plurality of second pixels, wherein each of the plurality of first scan stages receives a first masking signal from among the plurality of masking signals, and each of the plurality of second scan stages receives a second masking signal from among the plurality of masking signals, wherein a first first scan stage among the plurality of first scan stages receives the first start signal as the carry signal from the driving controller, and wherein a first second scan stage among the plurality of second scan stages receives the second start signal as the carry signal from the driving controller.

2. The display device of claim 1, wherein, when the scan signal is output from a last scan stage among the plurality of first scan stages, the second start signal is output to the first second scan stage.

3. The display device of claim 1, wherein a first second display area and a second second display area adjacent to the first second display area are defined in the second display area, and wherein, during a multi-frequency mode, the driving controller controls the first second display area and the second second display area by using the second masking signal to operate the first second display area and the second second display area with different driving frequencies.

4. The display device of claim 3, wherein a first driving frequency of the first display area is lower than a first second driving frequency of the first second display area, and wherein a second second driving frequency of the second second display area is lower than the first second driving frequency of the first second display area.

5. The display device of claim 3, wherein, during the multi-frequency mode, at least one of the plurality of second scan stages masks the scan signal provided to a plurality of second pixels disposed in the second second display area from among the plurality of second pixels based on the second masking signal.

6. The display device of claim 1, wherein a number of the plurality of start signals is half a maximum number of areas operatable with different driving frequencies from each other in the display area.

7. The display device of claim 1, wherein, when the first masking signal provided to the first first scan stage is enabled, the driving controller disables the first start signal.

8. The display device of claim 7, wherein, when the second masking signal provided to the first second scan stage is enabled, the driving controller disables the second start signal.

9. The display device of claim 1, wherein, when the corresponding one of the plurality of masking signals provided to a scan stage among the plurality of scan stages is enabled, the scan stage masks the scan signal thereof.

10. The display device of claim 1, wherein each of the remaining first scan stages among the plurality of first scan stages other than the first first scan stage receives the scan signal of a previous first scan stage as the carry signal, and wherein each of the remaining second scan stages among the plurality of second scan stages other than the first second scan stage receives the scan signal of a previous second scan stage as the carry signal.

11. The display device of claim 1, wherein the display area further includes a third display area spaced from the first display area, with the second display area interposed therebetween, wherein the plurality of start signals further include a third start signal, wherein the plurality of pixels further include a plurality of third pixels disposed in the third display area, wherein the plurality of scan stages further include a plurality of third scan stages connected to the plurality of third pixels, wherein each of the plurality of third scan stages receives a third masking signal from among the plurality of masking signals, and wherein a first third scan stage among the plurality of third scan stages receives the third start signal as the carry signal from the driving controller.

12. The display device of claim 11, wherein a first third display area and a second third display area adjacent to the first third display area are defined in the third display area, and wherein, during a multi-frequency mode, the driving controller controls the first third display area and the second third display area by using the third masking signal to operate the first third display area and the second third display area with different driving frequencies.

13. The display device of claim 12, wherein, during the multi-frequency mode, the first display area, the second display area, and the first third display area operate with a same driving frequency.

14. The display device of claim 12, wherein, during the multi-frequency mode, each of the first display area and the second third display area operates with a first driving frequency, wherein a second driving frequency of the second display area is higher than the first driving frequency of the first display area, and wherein a third driving frequency of the first third display area is lower than the second driving frequency of the second display area.

15. A display device comprising:

a display panel including a plurality of pixels connected to a plurality of scan lines, wherein a display area including a first display area and a second display area is defined in the display panel;

a scan driving circuit including a plurality of scan stages corresponding to the plurality of scan lines, respectively, wherein each of the plurality of scan stages receives a corresponding one of a plurality of masking signals and a carry signal and outputs a scan signal; and a driving controller, wherein, in a multi-frequency mode, the driving controller divides the display panel into the first display area and the second display area, controls the scan driving circuit such that the first display area and the second display area operate with different frequencies from each other, and outputs a plurality of start signals including a first start signal and a second start signal, wherein the first start signal and the second start signal are provided at different timings from each other, wherein each stage disposed in the first display area from among the plurality of scan stages receives a first masking signal from among the plurality of masking signals, wherein each stages disposed in the second display area from among the plurality of scan stages receives a second masking signal from among the plurality of masking signals, wherein a first scan stage disposed in the first display area from among the plurality of scan stages receives the first start signal as the carry signal, and wherein a first scan stage disposed in the second display area from among the plurality of scan stages receives the second start signal as the carry signal.

16. The display device of claim 15, wherein, when the scan signal is output from a last scan stage disposed in the first display area from among the plurality of scan stages, the second start signal is output.

17. The display device of claim 15, wherein a first second display area and a second second display area adjacent to the first second display area are defined in the second display area, and wherein, during the multi-frequency mode, the driving controller controls the first second display area and the second second display area by using the first masking signal and the second masking signal to operate the first second display area and the second second display area with different driving frequencies.

18. The display device of claim 15, wherein, when the first masking signal provided to the first scan stage disposed in the first display area is enabled, the driving controller disables the first start signal.

19. The display device of claim 18, wherein, when the second masking signal provided to the first scan stage disposed in the second display area is enabled, the driving controller disables the second start signal.

20. An electronic device comprising:

a display panel including a plurality of pixels connected to a plurality of scan lines, wherein a display area including a first display area and a second display area is defined in the display panel;

a scan driving circuit including a plurality of scan stages corresponding to the plurality of scan lines, respectively, wherein each of the plurality of scan stages receives a corresponding one of a plurality of masking signals and a carry signal and outputs a scan signal; and a driving controller which controls the scan driving circuit and outputs a plurality of start signals including a first start signal and a second start signal, wherein the plurality of pixels includes a plurality of first pixels disposed in the first display area and a plurality of second pixels disposed in the second display area, wherein the plurality of scan stages include a plurality of first scan stages connected to the plurality of first pixels and a plurality of second scan stages connected to the plurality of second pixels, wherein each of the plurality of first scan stages receives a first masking signal from among the plurality of masking signals, and each of the plurality of second scan stages receives a second masking signal from among the plurality of masking signals, wherein a first first scan stage among the plurality of first scan stages receives the first start signal as the carry signal from the driving controller, and wherein a first second scan stage among the plurality of second scan stages receives the second start signal as the carry signal from the driving controller.

* * * * *